US009264140B2

(12) United States Patent
    Kuwabara

(10) Patent No.: US 9,264,140 B2
(45) Date of Patent: Feb. 16, 2016

(54) TRANSMISSION METHOD, TRANSMISSION EQUIPMENT AND TRANSMISSION SYSTEM

(71) Applicant: FUJITSU LIMITED, Kawasaki-shi, Kanagawa (JP)

(72) Inventor: Takashi Kuwabara, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 221 days.

(21) Appl. No.: 14/148,940

(22) Filed: Jan. 7, 2014

(65) Prior Publication Data

US 2014/0226981 A1    Aug. 14, 2014

(30) Foreign Application Priority Data

Feb. 14, 2013  (JP) ................................. 2013-026526

(51) Int. Cl.
    *H04B 10/27*    (2013.01)
    *H04J 3/16*     (2006.01)
    *H04B 10/00*    (2013.01)
    *H04J 3/07*     (2006.01)

(52) U.S. Cl.
    CPC ................ *H04B 10/27* (2013.01); *H04B 10/00* (2013.01); *H04J 3/07* (2013.01); *H04J 3/1652* (2013.01)

(58) Field of Classification Search
    CPC ........... H04B 10/27; H04B 10/00; H04J 3/07; H04J 3/1652
    See application file for complete search history.

(56) References Cited

U.S. PATENT DOCUMENTS

| 8,249,108 | B2 * | 8/2012 | Katagiri | H04J 3/07 |
| | | | | 370/474 |
| 8,374,186 | B2 * | 2/2013 | Dong | H04J 3/1652 |
| | | | | 370/395.51 |
| 2007/0076767 | A1 * | 4/2007 | Loprieno | H04J 3/076 |
| | | | | 370/539 |
| 2010/0040370 | A1 * | 2/2010 | Aoki | H04J 3/1652 |
| | | | | 398/58 |
| 2010/0067547 | A1 | 3/2010 | Katagiri et al. | |
| 2012/0134676 | A1 | 5/2012 | Kikuchi | |
| 2015/0071311 | A1 * | 3/2015 | Caggioni | H04J 3/16 |
| | | | | 370/540 |

FOREIGN PATENT DOCUMENTS

| JP | 2009-159062 A | 7/2009 |
| JP | 2010-62682 A  | 3/2010 |
| JP | 2012-119759 A | 6/2012 |

* cited by examiner

*Primary Examiner* — Melvin Marcelo
(74) *Attorney, Agent, or Firm* — Fujitsu Patent Center

(57) ABSTRACT

A transmission method that transmits an optical signal via a plurality of virtual lanes in dual polarization or multi-level modulation includes: receiving a first frame signal of a first frequency and a second frame signal of a second frequency, and storing the first and second frame signals on a memory; reading out the first frame signal from the memory at a third frequency, and inserting a stuff into the first frame signal such that a difference between the first frequency and the third frequency is adjusted to generate a third frame signal; reading out the second frame signal from the memory at the third frequency, and inserting a staff into the second frame signal such that a difference between the second frequency and the third frequency is adjusted to generate a fourth frame signal; and transmitting the third and fourth frame signals respectively via different virtual lanes.

14 Claims, 27 Drawing Sheets

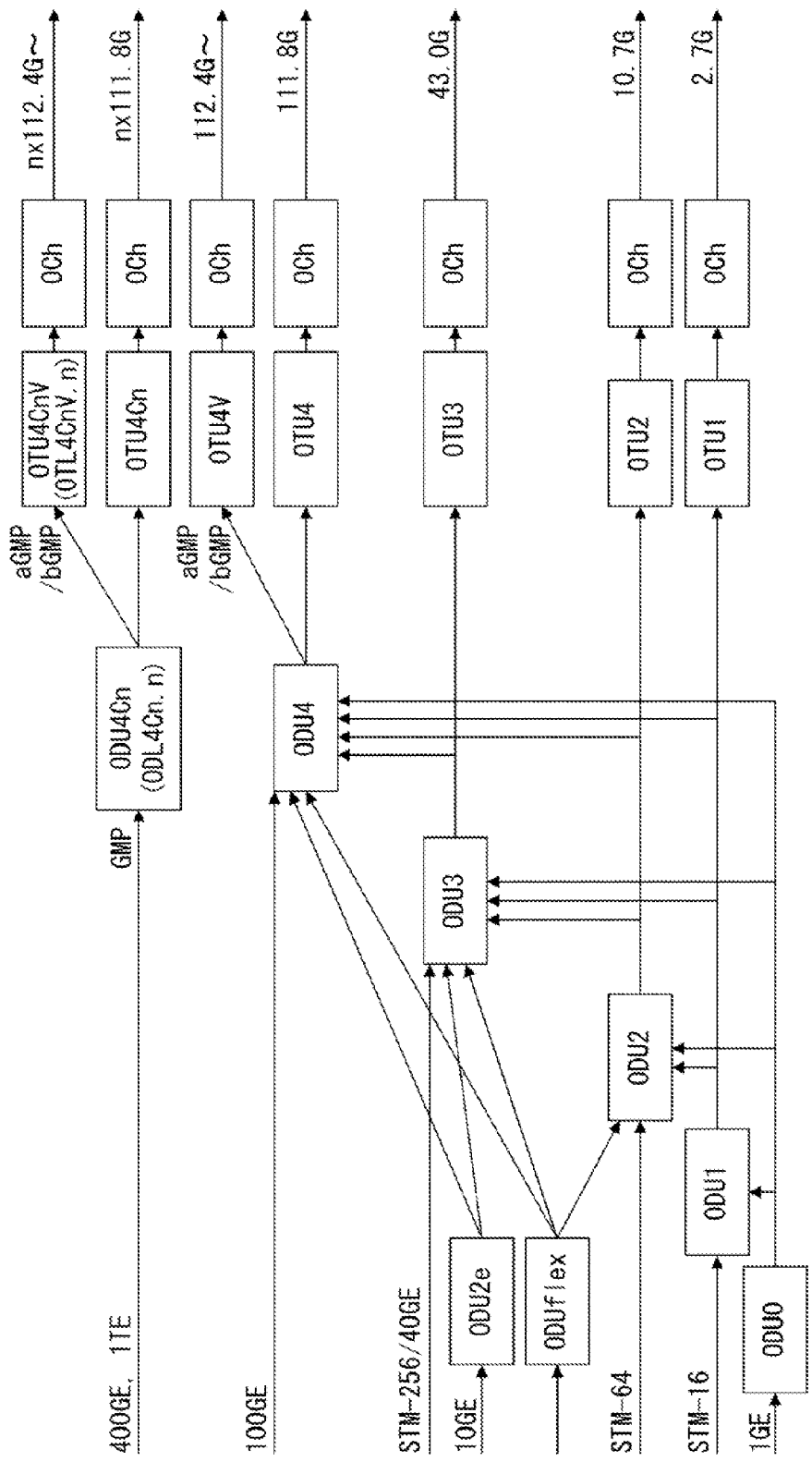
F I G. 1

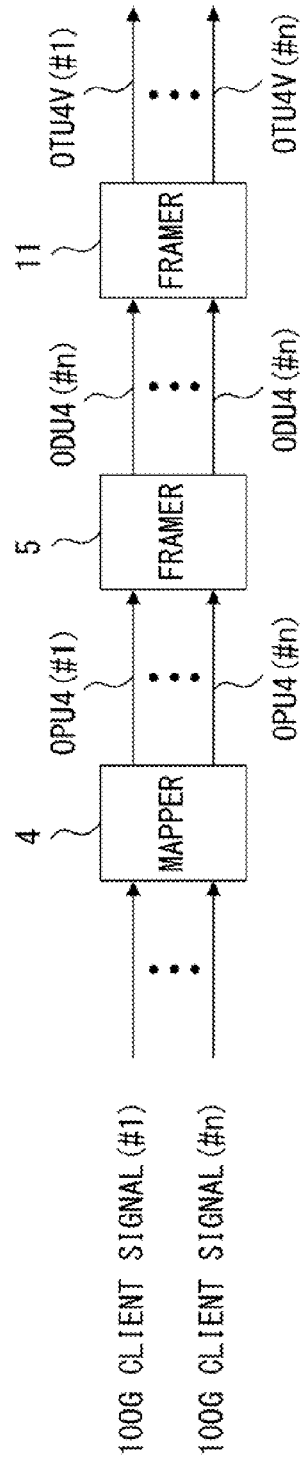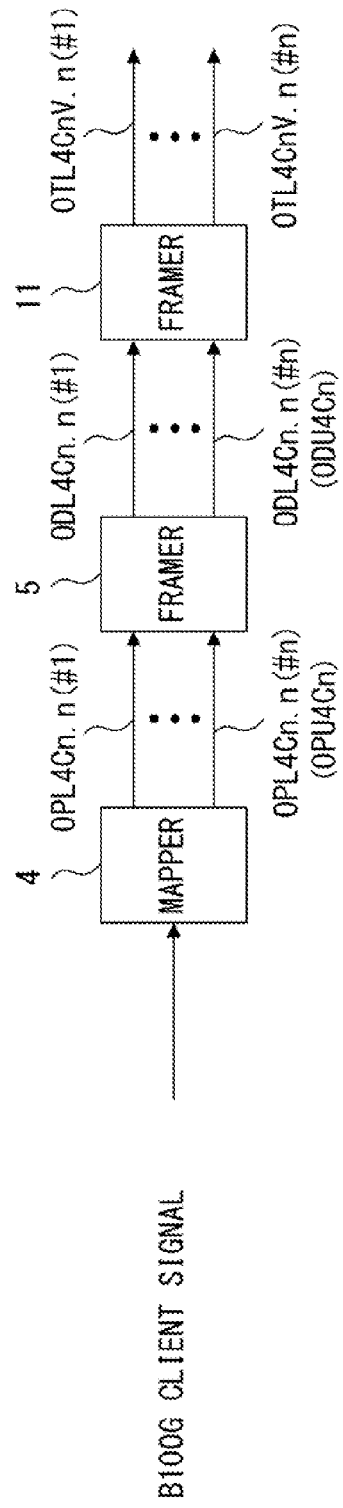

FIG. 10A

| TYPE | Nominal bit rate (kbit/s) | Tolerance | Note |
|---|---|---|---|
| 400GBASE-R | 66B / 64B × 400 000 000 | ±100ppm | Assuming 66B/64B |
| ODU4Cn | n × 239 / 227 × 99 532 800 | ±20ppm | n × ODU4 |
| OPU4Cn payload | n × 238 / 227 × 99 532 800 | ±20ppm | n × OPU4 payload |
| ODTU4Cn.ts | ts × 380 / 3824 × ODU4Cn bit rate | | |

FIG. 10B

| Nominal bit rate (kbit/s) | bit rate tolerance | Floor C8,min | Minimum C8 | Nominal C8 | Maximum C8 | Ceiling C8,max |
|---|---|---|---|---|---|---|
| 412 500 000 | ±100ppm | 188 | 188.131 | 188.154 | 188.177 | 189 |

FIG. 10C

| Nominal bit rate (kbit/s) | bit rate tolerance | Floor C8,min | Minimum C8 | Nominal C8 | Maximum C8 | Ceiling C8,max |
|---|---|---|---|---|---|---|
| 412 500 000 | ±100ppm | 60202 | 60202.073 | 60209.298 | 60216.523 | 60217 |

FIG. 10D

| Row\Column | 15 | 16 | 17 | ----- | 56 | 57 | ----- | 96 | 97 | ----- | 3776 | ----- | 3816 | 3817 | ----- | 3824 | |
|---|---|---|---|---|---|---|---|---|---|---|---|---|---|---|---|---|---|
| 1 | JC4 | JC1 | 1 | | 1 | 1 | | 1 | 2 | | 48 | | 48 | | FIXED STUFF | | OPL4C4.4 |
| 2 | JC5 | JC2 | 48 | | 48 | 49 | | 49 | 49 | | 95 | | 95 | | | | |
| 3 | JC6 | JC3 | 96 | | 96 | 96 | | 96 | 97 | | 143 | | 143 | | | | |
| 4 | PSI | RES | 143 | | 143 | 144 | | 144 | 144 | | 190 | | 190 | | | | |

FIG. 20A

ODL4Ch.n/ODU4 — 1 to 3824, rows 1 to 4

FIG. 20B

OTL4CnV.n/OTU4V — OH (columns 1-16), then 17 to 3824, then 16X FEC, rows 1 to 4

| Column Row | 15 | 16 | 17 | 1 | 2 | ... | 32 | 33 | ... | 48 | 49 | ... | 3811 | 3812 | ... | 3824 |
|---|---|---|---|---|---|---|---|---|---|---|---|---|---|---|---|---|
| 1 | JC4 | JC1 | 1 | 1 | 2 | | 239 | 240 | | 2 | 3 | | 237 | 238 | | 238 |
| 2 | JC5 | JC2 | 239 | 239 | 240 | | 477 | 478 | | 240 | 241 | | 475 | 476 | | 476 |
| 3 | JC6 | JC3 | 477 | 477 | 478 | | 715 | 716 | | 478 | 479 | | 713 | 714 | | 714 |
| 4 | PSI | RES | 715 | 715 | 716 | | | | | 716 | 717 | | 951 | 952 | | 952 |

Cm (m=128) for ODL4Ch.n/ODU4.n/OTU4V into OTL4CnV.n/OTU4V

| Nominal bit rate (kbit/s) | bit rate tolerance | Floor C128,min | Minimum C128 | Nominal C128 | Maximum C128 | Ceiling C128,max |
|---|---|---|---|---|---|---|
| 104 794 446 | ±20ppm | 950 | 950.962 | 951.000 | 951.038 | 952 |

F I G. 2 1

F I G. 22

Cm = 950

| Column Row | 15 | 16 | 17 | ... | 32 | 33 | ... | 48 | 49 | ... | 3811 | 3812 | ... | 3824 |
|---|---|---|---|---|---|---|---|---|---|---|---|---|---|---|
| 1 | JC4 | JC1 | STUFF | | | 2 | | 2 | 3 | | | 237 | | 238 |
| 2 | JC5 | JC2 | 239 | | 239 | 240 | | 240 | 241 | | | 475 | 476 | 476 |
| 3 | JC6 | JC3 | 477 | STUFF | | 478 | | 478 | 479 | | | 713 | 714 | 714 |
| 4 | PSI | RES | 715 | | 715 | 716 | | 716 | 717 | | | 951 | 952 | 952 |

Cm = 951

| Column Row | 15 | 16 | 17 | ... | 32 | 33 | ... | 48 | 49 | ... | 3811 | 3812 | ... | 3824 |
|---|---|---|---|---|---|---|---|---|---|---|---|---|---|---|
| 1 | JC4 | JC1 | STUFF | | | 2 | | 2 | 3 | | | 237 | 238 | 238 |
| 2 | JC5 | JC2 | 239 | | 239 | 240 | | 240 | 241 | | | 475 | 476 | 476 |
| 3 | JC6 | JC3 | 477 | | 477 | 478 | | 478 | 479 | | | 713 | 714 | 714 |
| 4 | PSI | RES | 715 | | 715 | 716 | | 716 | 717 | | | 951 | 952 | 952 |

Cm = 952

| Column Row | 15 | 16 | 17 | ... | 32 | 33 | ... | 48 | 49 | ... | 3811 | 3812 | ... | 3824 |
|---|---|---|---|---|---|---|---|---|---|---|---|---|---|---|
| 1 | JC4 | JC1 | 1 | | 1 | 2 | | 2 | 3 | | | 237 | 237 | 238 |
| 2 | JC5 | JC2 | 239 | | 239 | 240 | | 240 | 241 | | | 475 | 476 | 476 |
| 3 | JC6 | JC3 | 477 | | 477 | 478 | | 478 | 479 | | | 713 | 714 | 714 |
| 4 | PSI | RES | 715 | | 715 | 716 | | 716 | 717 | | | 951 | 952 | 952 |

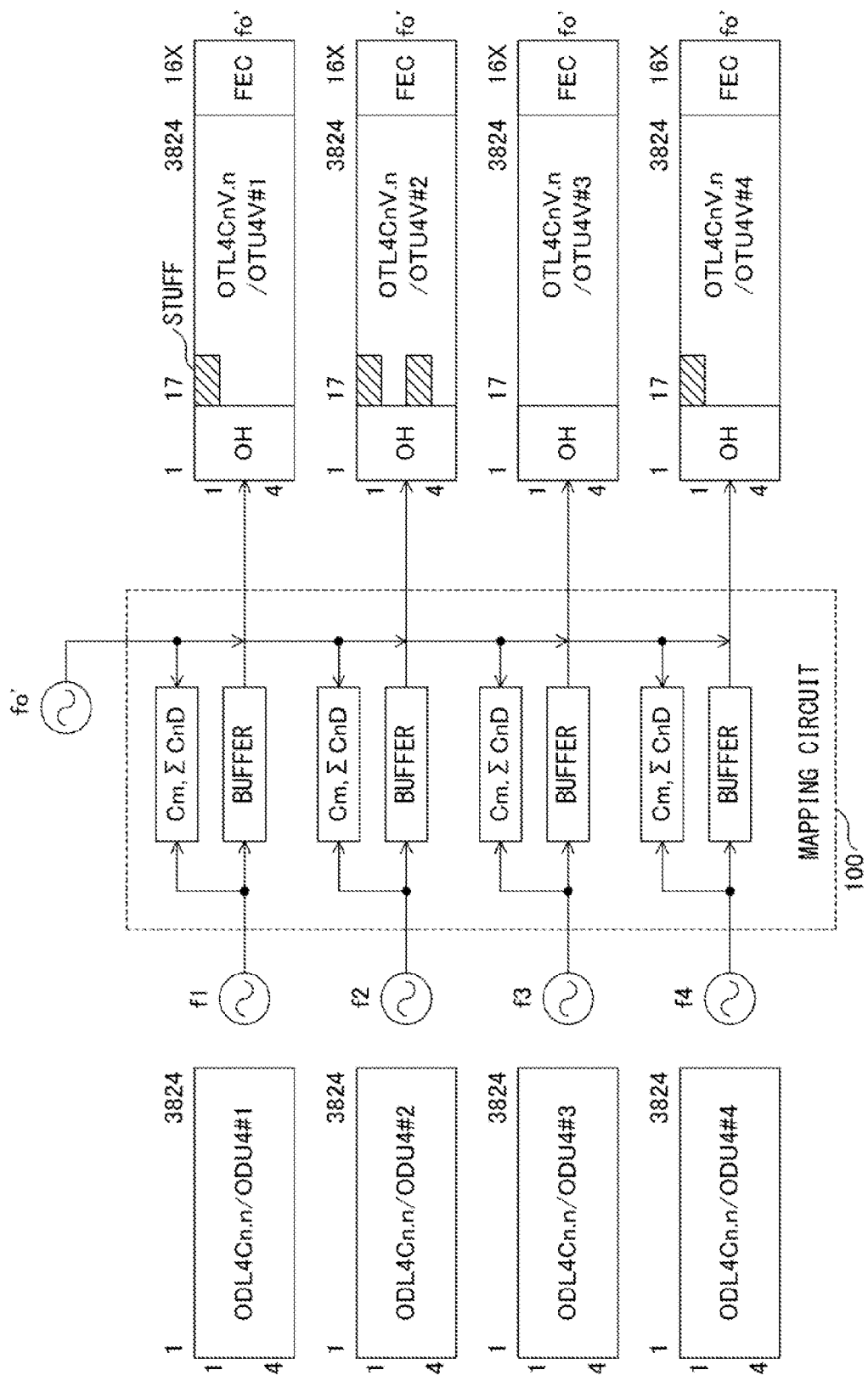
F I G. 23

| MFAS 5678 | 1 | 2 | 3 | 4 | 5 | 6 | 7 | 8 |
|---|---|---|---|---|---|---|---|---|
| 0000 | DMt1 | DMt2 | DMt3 | DMt4 | DMt5 | DMt6 | DMp | MFI1 (MSB) |
| 0001 | | | | | | | | MFI2 (LSB) |
| ... | | | | | | | | |
| 0111 | | | | | | | | |
| 1000 | | | | | | | | |
| 1001 | | | | | | | | |
| ... | | | | | | | | |
| 1111 | | | | | | | | |

FIG. 27A

| MFAS 12345678 | 1 (MSB) | 2 | 3 | 4 | 5 | 6 | 7 | 8 (LSB) |
|---|---|---|---|---|---|---|---|---|
| 00000000 | MFI1 | | | | | | | MFI2 |
| 00000001 | | | | | Reserved | | | |
| 00000010 | | | | | | | | |
| ... | | | | | | | | |
| 11111111 | | | | | | | | |

FIG. 27B

TRANSMISSION METHOD, TRANSMISSION EQUIPMENT AND TRANSMISSION SYSTEM

CROSS-REFERENCE TO RELATED APPLICATION

This application is based upon and claims the benefit of priority of the prior Japanese Patent Application No. 2013-026526, filed on Feb. 14, 2013, the entire contents of which are incorporated herein by reference.

FIELD

The embodiments discussed herein are related to a method, equipment and a system that transmit data using a frame.

BACKGROUND

In the OTN (Optical Transport Network) standardized by the ITU-T Recommendation, a client signal is mapped to ODUk (Optical channel Data Unit) (where k=0, 1, 2, 3, 4, etc., for example). A lower order ODUk (LO ODUk) is multiplexed into a higher order ODUk (HO ODUk) by the time division multiplexing so as to be transmitted. 100 Gbps data is transmitted in ODU4, for example. Schemes for transmitting large-volume data of more than 100 Gbps over the OTN have recently been considered.

Techniques to realize transmission of large-volume data are described in Japanese Laid-Open Patent Publication No. 2012-119759, Japanese Laid-Open Patent Publication No. 2010-062682, and Japanese Laid-Open Patent Publication No. 2009-159062, for example.

Transmission of a high-speed signal of more than 100 Gpbs over the OTN may be realized by defining a frame of a higher order than the ODU4, for example. A frame realizing a bit rate n times higher than a bit rate of the ODU4 is referred to as "ODU4Cn (or ODUCn)". For example, ODU4C2 has a transmission capacity approximately twice as large as that of the ODU4, and ODU4C4 has a transmission capacity approximately four times larger than that of the ODU4.

It is, however, difficult to realize a symbol rate of 100 Gbaud or more because of a limit of increase in high speed of hardware circuits.

SUMMARY

According to an aspect of the embodiments, a transmission method that transmits an optical signal from transmitting node equipment to receiving node equipment via a plurality of virtual lanes in dual polarization or multi-level modulation includes: receiving a first frame signal of a first frequency and a second frame signal of a second frequency, and storing the first frame signal and the second frame signal on a memory in the transmitting node equipment; reading out the first frame signal from the memory at a third frequency, and inserting a stuff into the first frame signal read out from the memory such that a difference between the first frequency and the third frequency is adjusted to generate a third frame signal; reading out the second frame signal from the memory at the third frequency, and inserting a stuff into the second frame signal read out from the memory such that a difference between the second frequency and the third frequency is adjusted to generate a fourth frame signal; and transmitting the third fame signal and the fourth frame signal respectively via different virtual lanes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a multiplexing hierarchy of ODU;
FIGS. 9A and 9B are drawings explaining processing of mapping a client signal to an OTN frame;
FIGS. 10A-10D illustrate examples of processing of mapping a client signal to the OTN frame;
FIGS. 20A and 20B illustrate examples of the mapping;
FIG. 22 illustrates an example of an expected range of Cm;
FIG. 22 illustrates an example of positions where a stuff is allocated;
FIG. 23 illustrates an example of the mapping by the asynchronous GMP;
FIGS. 27A and 27B are drawings explaining a method of detecting skew amount.

DESCRIPTION OF EMBODIMENTS

Embodiments of the present invention will be described with reference to drawings. Configurations of data transmission over the OTN of the ITU-T recommendation will be described as an example of embodiments of the present invention.

FIG. 1 illustrates a multiplexing hierarchy of ODU (Optical channel Data Unit) in the OTN. In the ITU-T recommendation, ODU0, ODU1, ODU2, ODUflex, ODU2e, ODU3, and ODU4 are specified. Each ODUk is multiplexed (or mapped) into a higher order ODUk if necessary. For example, ODU0 may be multiplexed into ODU1, OOU2, ODU3, or ODU4. ODU1 may be multiplexed into ODU2, ODU3, or ODU4.

OTUk (Optical channel Transport Unit) is generated by adding a forward error correction (FEC) and others to a corresponding ODUk. This OTUk is converted into a corresponding OCh (Optical Channel, with full functionality). The OCh is allocated to a corresponding OCC (Optical Channel Carrier) (not illustrated). This OCh is allocated to the corresponding OCC with any one of the following methods:
(1) One OCh is allocated to one OCC.
(2) One OCh is allocated to q OCCs.
(3) p OChs are allocated to one OCC.
The method (2) indicates that one OCh is transmitted on q subcarriers. The method (3) indicates that p OChs are transmitted using one wavelength.

Figure 2:
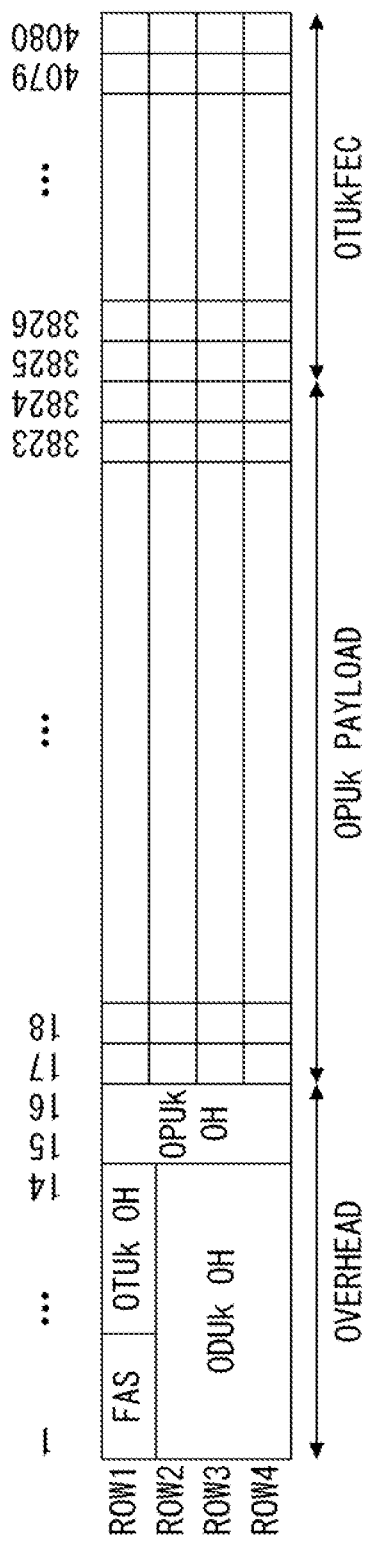
FIG. 2 illustrates a format of an OTU frame.

FIG. 2 illustrates a format of an OTU frame. The OTU frame has 4080 columns×4 rows. The OTU frame includes an overhead, an OPUk payload, and an OTUkFEC.

The overhead is allocated in the 1st to 16th columns of the OTN frame. The overhead includes an FAS (Frame Alignment Signal), an OTUk overhead, an ODUk overhead, and an OPUk overhead. The overhead is used for managing connection and quality. The OPUk payload is allocated in the 17th to 3824th columns of the OTN frame. The client signals are mapped in the OPUk payload. Alternatively, the lower order ODUk may be mapped to the OPUk payload. The overhead is added to the OPUk payload so as to generate the ODUk. The OTUkFEC is allocated in 3825th to 4080th columns of the OTN frame. The OTUkFEC is used for correcting an error generated during a transmission. The OTUkFEC is added to the ODUk, thereby generating the OTUk.

In this manner, in the multiplexing hierarchy of the OTN, the lower order ODUk is mapped to the higher order ODUk by the time division multiplexing. In the frame mapping by the time division multiplexing, however, if the transmission capacity of the higher order ODUk is n times larger than the transmission capacity of the lower order ODUk, the bit rate of the higher order ODUk is defined to be n times higher than the bit rate of the lower order ODUk taking account of the difference in frequency deviation of the clock signal. Hence, the configuration of the transmission equipment becomes more complicated if a frame having a larger capacity (referred to as "ODUx", hereinafter; than that of the ODU4 is defined in the multiplexing hierarchy of the OTN.

In this case, the symbol rate of the ODUx becomes different from the symbol rate of the ODU4. Hence, a circuit that processes the OTN frame, a digital signal processor that carries out signal conversion between an OTN frame signal and a modulated signal, and an optical front end module that receives an optical signal are required to operate at both symbol rates of the ODU 4 and of the ODUx.

Figure 3A:
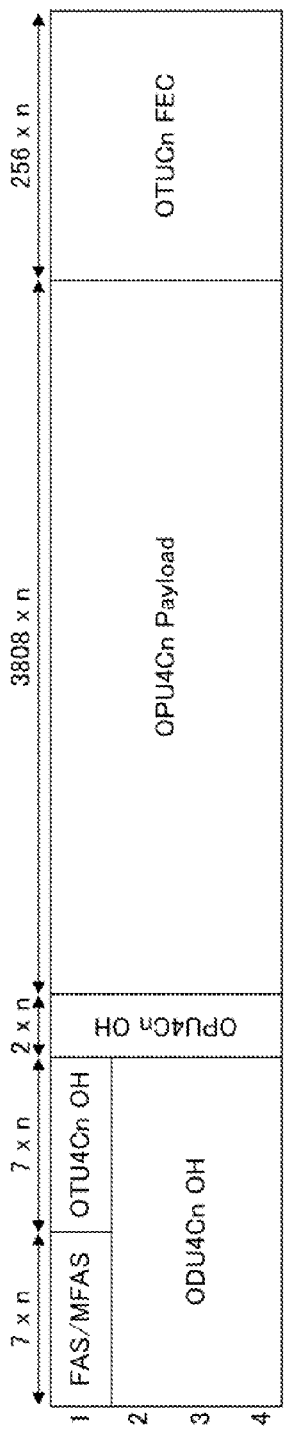
FIG. 3A illustrates a format of OTU4Cn.

In the transmission method of the present embodiment, in order to realize a transmission of large-volume data of more than 100 Gbps, ODU4Cn is used, as illustrated in FIG. 1. The OTU4Cn of the present embodiment to which the ODU4Cn is mapped has n×4080 columns×4 rows, as illustrated in FIG. 3A. Specifically, the overhead of the OTU4Cn has n×16 columns×4 rows for accommodating the overheads of the n OTUks. The payload of the OPU4Cn has n×3808 columns×4 rows for accommodating the payloads of the n OTUks. The OTU4CnFEC has n×256 columns×4 rows for accommodating the OTUkFEC of the n OTUks.

Accordingly, the ODU4Cn can realize a bit rate n times higher than the bit rate of the ODU4. For example, the ODU4 can transmit data of 100 Gbps. Hence the ODU4Cn can transmit data of n×100 Gbps.

As illustrated in FIG. 1, a client signal of more than 100 Gbps may be mapped to the ODU4Cn. For example, a 400GE signal may be mapped to ODU4C4, and an 1TE signal may be mapped to ODU4C10, In this case, the client signal is mapped to the ODU4Cn by the generic mapping procedure (GMP), for example.

OTU4Cn is decomposed into n OTL4Cn.n subframes #1 to #n so as to be processed, ".n" denotes that a single frame is decomposed into n subframes. "L" denotes a "lane".

Figure 3B:
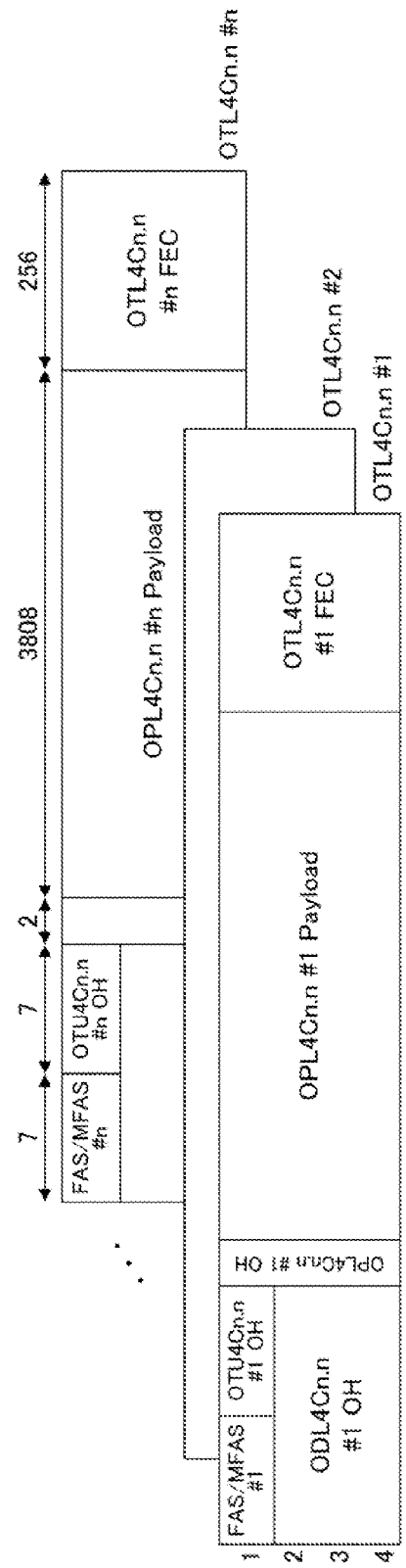
FIG. 3B illustrates a format of OTL4Cn.n.

Each OTL4Cn.n subframe has the same format. Specifically, each OTL4Cn.n subframe has 4080 columns×4 rows, as illustrated in FIG. 3B. The overhead of each OTL4Cn.n has 16 columns×4 rows. This overhead includes FAS (or MFAS (Multi Frame Alignment Signal)), an OTL4Cn.n overhead, an ODL4Cn.n overhead, an OPL4Cn.n overhead. The OPL4Cn.n payload has 3808 columns×4 rows. The OTL4Cn.nFEC has 256 columns×4 rows. OTL, ODL, and OPL denote an Optical channel Transport Lane, an Optical channel Data Lane, and an Optical channel Payload Lane, respectively.

As described above, the OTL4Cn.n format is substantially the same as that of the OTU4. Specifically, the ODU4Cn is processed by being decomposed into n ODL4Cn.n subframes #1 to #n having substantially the same format as that of the ODU4.

The ODU4Cn is mapped to the OTU4Cn in the same manner as that of the mapping from the ODU4 to the OTU4. As illustrated in FIG. 1, according to the transmission equipment and the transmission method of the present embodiment, the ODU4Cn can be mapped to the OTU4CnV. It should be noted that "V" denotes that this is functionally standardized. At this time, in the transmission equipment and the transmission method of the present embodiment, the ODU4Cn can be mapped to the OTU4CnV by asynchronous GMP (aGMP) or by bit-synchronous GMP (bGMP). In this case, the ODL4Cn.n subframes #1 to #n are mapped to the OTL4CnV.n subframes #1 to #n, respectively.

Similarly, as illustrated in FIG. 1, in the transmission equipment and the transmission method of the present embodiment, the ODU4 can be mapped to the OTU4V. The method of mapping the ODU4/ODU4Cn to the OTU4V/OTU4CnV will be described in detail later.

Figure 4:
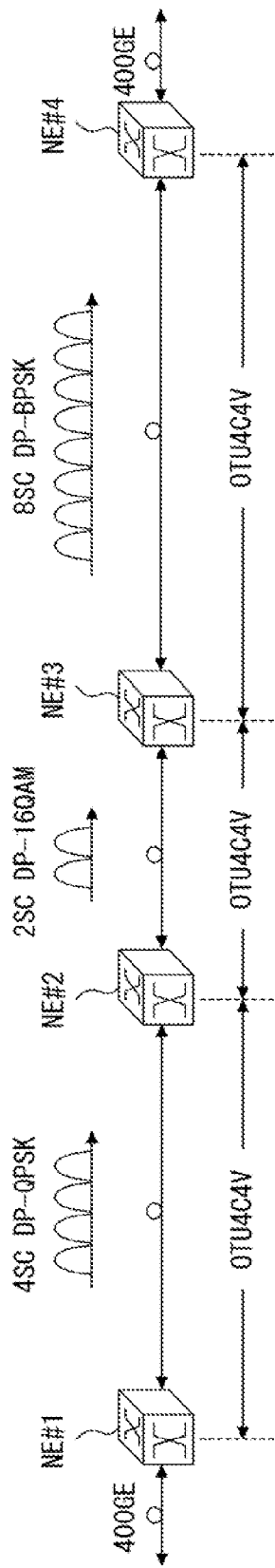
FIG. 4 illustrates an example of a transmission system.

FIG. 4 illustrates an example of the transmission system of the present embodiment. In this example, the transmission system includes four node equipments NE#1 to NE#4. Optical fibers are installed between the node equipment NE#1 and the node equipment NE#4. The node equipment NE#2 and the node equipment NE#3 operate as relay node equipment.

The transmission system illustrated in FIG. 4 can transmit optical signals in both directions between the node equipment NE#1 and the node equipment NE#4. It is assumed that optical signals are transmitted from the node equipment NE#1 to the node equipment NE#4 in the following description. In this case, the node equipment NE#1 operates as transmitting node equipment, and the node equipment. NE#4 operates as receiving node equipment.

A client signal oil 400 Gbps is input in the node equipment NE#1. The node equipment NE#1 maps this client signal to the ODU4C4. The ODU4C4 is further mapped to the OTU4C4V, and thereafter, is transmitted to the node equipment NE#4 through a virtual lane generated by the Wavelength Division Multiplexing (WDM), the Dual Polarization (DP), and/or various modulation schemes (BPSK, QPSK, 16QAM, etc.).

The "virtual lane" denotes a virtual transmission path that can be deemed as a single line for transmitting signals in the present specification. For example, one wavelength (or subcarrier) provides one virtual lane. One polarized wave (H polarization, V polarization) provides one virtual lane. A multi-level modulation component (I component, Q component) can provide one virtual, lane or plural virtual lanes. Hence, a combination of the WDM, the dual polarization, and/or the modulation schemes (such as multi-level modulation) can generate a plurality of virtual lanes.

The modulation scheme is selected depending on the distance between the nodes, for example. The modulation scheme having a smaller bit rate of transmission per symbol (e.g. BPSK) is selected for a longer distance between the nodes. The modulation scheme having a greater bit rate of transmission per symbol (e.g. 16QAM) is selected for a shorter distance between the nodes. In an example illustrated in FIG. 4, the distance between the node equipment NE#2 and the node equipment NE#3 is short. Hence, 16QAM is selected for data transmission between the node equipment NE#2 and the node equipment NE#3. The distance between the node equipment NE#3 and the node equipment NE#4 is long. Hence, BPSK is selected for data transmission between the node equipment NE#3 and the node equipment NE#4. The distance between the node equipment NE#1 and the node equipment NE#2 is longer than the distance between the node equipment NE#2 and the node equipment NE#3, and is shorter than the distance between the node equipment NE#3 and the node equipment NE#4. Thus, QPSK is selected for data transmission between the node equipment NE#1 and the node equipment NE#2.

In addition, it is determined how many number of subcarriers are used and whether or not the dual polarization is used depending on the selected modulation scheme. In this example, it is assumed that transmission is carried out at 25 Gbaud for simplicity of description. In this case, in order to realize 400 Gbps, it is necessary to transmit 16 bits in every symbol period. If the dual polarization is used in this case, the number of subcarriers is determined as follows.

Between the node equipments NE#1 and NE#2, four bits per symbol are transmitted by the DP-QPSK, and thus the number of subcarriers is four. Between the node equipments NE#2 and NE#3, eight bits per symbol, are transmitted by the DP-16QAM, and thus the number of subcarriers is two. Between the node equipments NE#3 and NE#4, two bits per symbol are transmitted by the DP-BPSK, and thus the number of subcarriers is eight.

The node equipment NB#1 maps an input client signal to the ODUk. In this example, the rate of the client signal is 400 Gbps. Hence, as aforementioned, the node equipment NE#1 maps the client signal to the ODU4C4.

The ODU4C4 is decomposed into four ODL4C4.4 #1 to #4 when the ODU4C4 is processed in the node equipment, and is transmitted. Each of the ODL4C4.4 #1 to #4 can transmit data at 100 Gbps as similar to the ODU4. The ODL4C4.4 #1 to #4 are mapped to the OTL4C4V.4 #1 to #4, respectively.

In this case, the OTL4C4V.4 subframes #1 to #4 are transmitted via different virtual lanes. For example, between the node equipments NE#1 and NE#2, the OTL4C4V.4 subframes #1 to #4 are transmitted on different subcarriers. Between the node equipments NE#2 and NE#3, two OTL4C4V.4 subframes are transmitted on a single subcarrier. At this time, on each subcarrier, two of the OTL4C4V.4 subframes are transmitted on the H polarization, and the other two of the OTL4C4V.4 subframes are transmitted on the V polarization, for example. Between the node equipments NE#3 and NE#4, each of the OTL4C4V.4 subframes is transmitted on two subcarriers.

Figure 5:
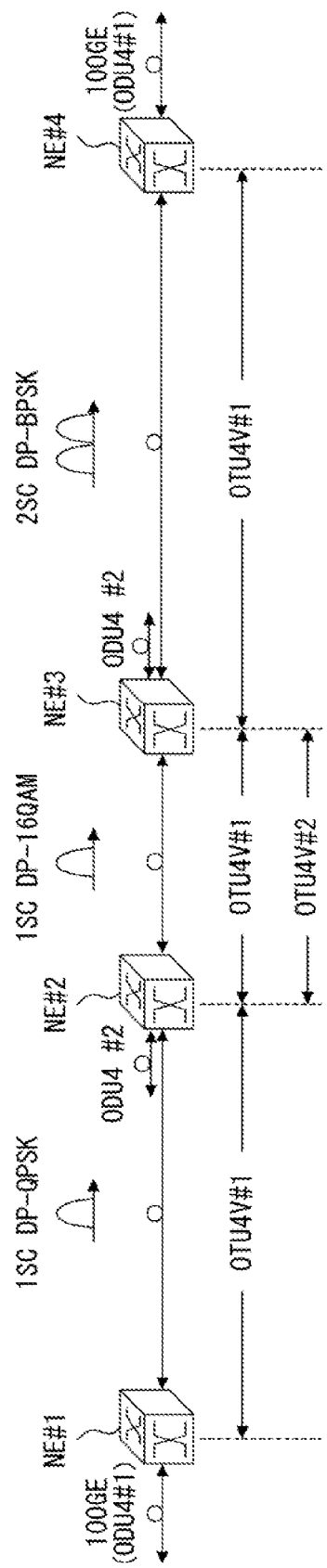
FIG. 5 illustrates another example of the transmission system.

FIG. 5 illustrates another operational example of the transmission system of the present embodiment. In the example of FIG. 5, the client signal of 100 Gbps is transmitted from the node equipment NE#1 to the node equipment NE#4.

The node equipment NE#1 maps the client signal to the ODU4. This ODU4 is referred to as an "ODU4 #1" in the following description. The ODU4 #1 is mapped to the OTU4V #1, and thereafter is transmitted via the virtual lane to the node equipment NE#4.

In the example of FIG. 5, another client signal is transmitted from the node equipment NE#2 to the node equipment NE#3. This client signal is mapped to the ODU4 #2 in the node equipment NE#2. The ODU4 #2 is mapped to the OTU4V #2, and thereafter, is transmitted via the virtual lane to the node equipment NE#3. Specifically, between the node equipments NE#2 and NE#3, the OTU4V frame #1 and the OTU4V frame #2 are transmitted via two virtual lanes.

In this case, the transmission scheme between the nodes is determined as follow. Specifically, between the node equipments NE#1 and NE#2, the DP-QPSK is selected; therefore, in order to realize 100 Gbps, the OTU4V frame #1 is transmitted using a single subcarrier. Between the node equipments NE#2 and NE#3, the DP-16QAM is selected; therefore, in order to realize 200 Gbps, the OTU4V frame #1 and the OTU4V frame #2 are transmitted using a single subcarrier. Between the node equipments NS#3 and NE#4, the DP-BPSK is selected; therefore, in order to realize 100 Gbps, the OTU4V frame #1 is transmitted using two subcarriers.

In this manner, in the transmission system of the present embodiment, a client signal of more than 100 Gbps is transmitted, using a plurality of OTL4CnV.n subframes. On the other hand, a client signal of 100 Gbps is transmitted using the OTU4V frame. The OTL4CnV.n subframes are defined to have substantially the same format as that of the OTU4V frame. Consequently, the clock frequency for processing the OTU4V frame and the clock frequency for processing the OTL4C4V.4 subframes are substantially the same as each other. In other words, the OTU4V frame and the OTL4CnV.n subframes have substantially the same symbol rate.

Thus, in the transmission system of the present embodiment, it is possible to process the OTL4C4V.4 subframes using a circuit for processing the OTU4V frame. In other words, in the transmission system of the present embodiment, it is unnecessary to provide each node equipment with a dedicated frame processing circuit for realizing data transmission of more than 100 Gbps. Accordingly, it is possible to prevent the configuration of the node equipment from becoming complicated, and also to reduce cost for developing and maintaining the node equipment.

Figure 6:
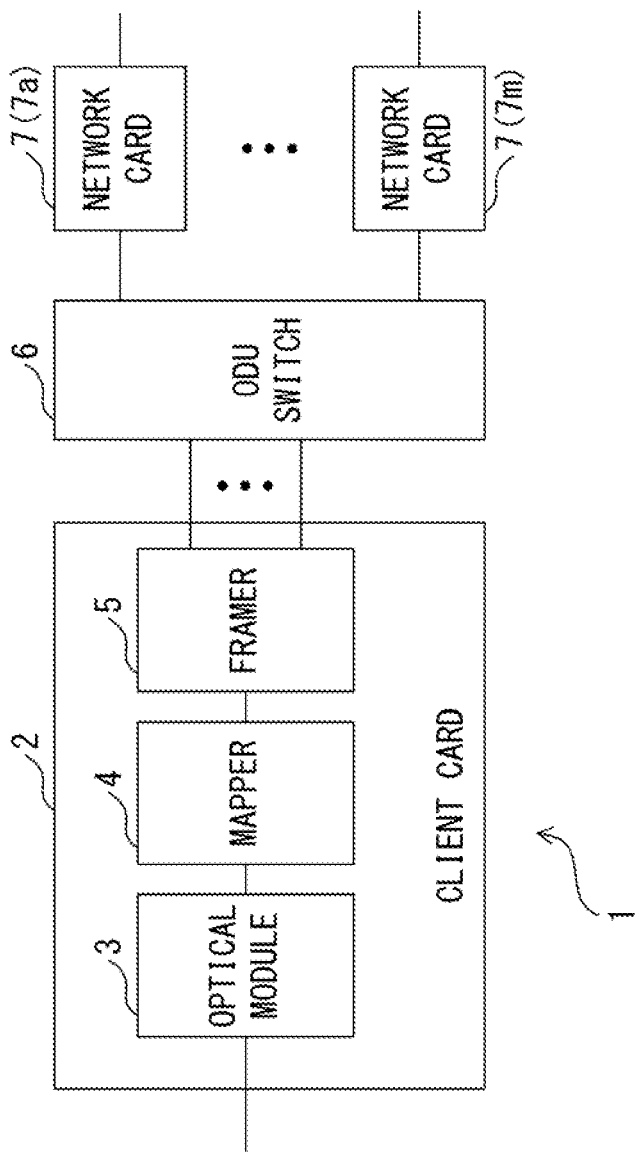
FIG. 6 illustrates a configuration of the transmission equipment.

FIG. 6 illustrates the configuration of the transmission equipment of the present embodiment. As illustrated in FIG. 6, the transmission equipment 1 of the present embodiment includes a client card 2, an ODU switch 6, and network cards 7 (7a-7m).

The client card 2 includes an optical module 3, a mapper 4, and a framer 5. The optical module 3 includes an optical receiver and an optical transmitter. The optical module 3 receives an optical signal generated by a client (i.e. client signal). The mapper 4 maps the received client signal to the OPUk. At this time, for example, the client signal of approximately 100 Gpbs is mapped to the OPU4. The client signal of higher than 100 Gbps is mapped to the OPU4Cn by the GMP. The framer 5 adds an overhead and others to the OPUk that is generated by the mapper 4 so as to generate the ODUk. At this time, the ODU4Cn is output as n ODL4Cn.n subframes #1 to #n. When the client card 2 receives a frame from the network, the client card 2 extracts client data from the received frame, and transmits this client data to the client.

The client card 2 generates the ODU4 at the following bit rate, for example.

ODU4: 239/22×99532800 kbps (±20 ppm)

In this case, the client card 2 generates the ODU4Cn at the following bit rate.

ODU4Cn: n×239/22×99532800 kbps (±20 ppm)

At this time, the ODU4Cn is output as the n ODL4Cn.n subframes #1 to #n. Accordingly, each ODL4Cn.n subframe has the save bit rate as that of the ODU4.

The ODU switch 6 guides the ODUk generated by the client card 2 to the corresponding network card 7 (7a-7m). The ODU switch 6 guides the ODUk output from the network card 7 (7a-7m) to the client card 2.

The transmission equipment 1 includes one or plural network cards 7. The number of network cards 7 included in the transmission equipment 1 depends on the configuration of the transmitting system. The type of the network cards 7 included in the transmission equipment 1 depends on the configuration of the transmission system. Examples of the network cards will be described later with reference to FIGS. 7A-7C.

The transmission equipment 1 may include no client card 2 when the transmission equipment 1 operates as the relay node equipment. For example, the node equipment NE#2 illustrated in FIG. 4 operates as the relay node equipment disposed between the node equipments NE#1 and NE#3. In this case, the transmission equipment 1 includes one or plural network cards for transmitting an optical signal between the transmission equipment 1 and the node equipment NE#1, and includes one or plural network cards for transmitting an optical signal between the transmission equipment 1 and the node equipment NE#3.

Figure 7A:
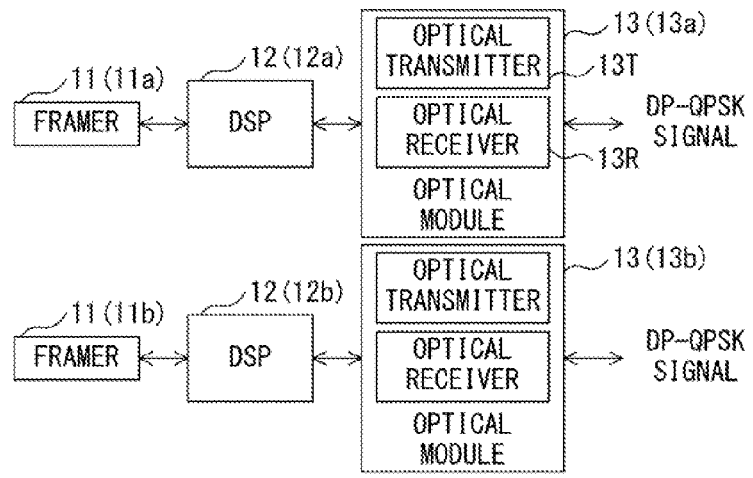
FIGS. 7A-7C illustrate examples of a network card.
Figure 7B:
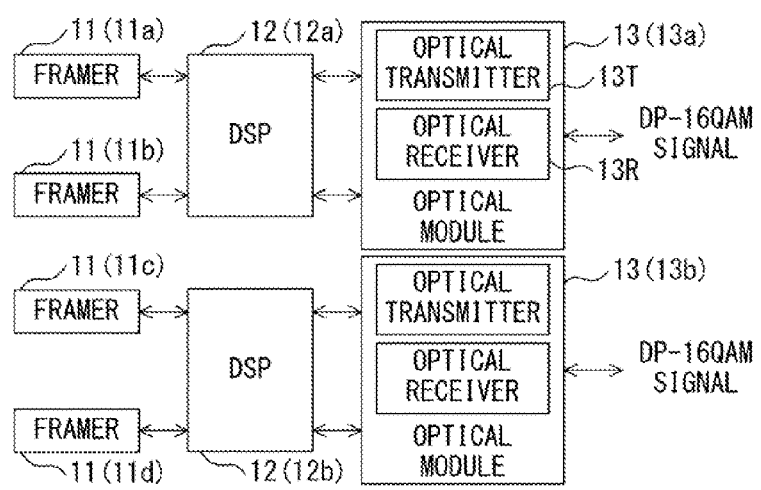
Figure 7C:
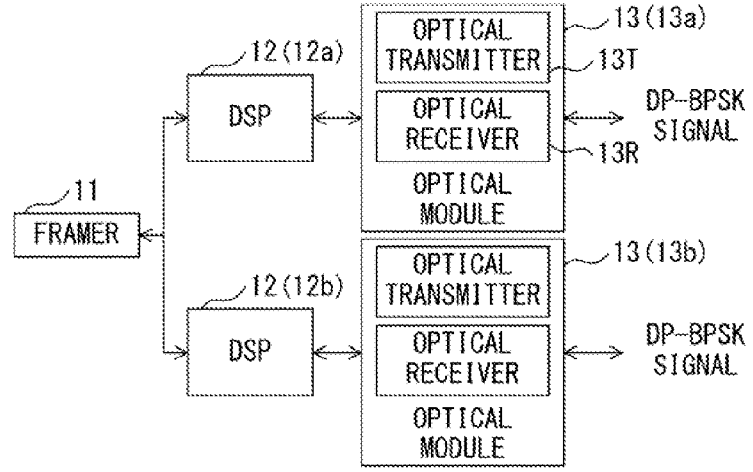

FIGS. 7A-7C illustrate some examples of the network card 7. Each network card 7 illustrated in FIGS. 7A-7C transmits a signal using two subcarriers. The number of subcarriers processed by each network card 7, however, is not limited to a specific one.

The network card illustrated in FIG. 7A includes framers 11 (11a, 11b), DSPs 12 (12a, 12b), and optical modules 13 (13a, 13b). Each framer 11 generates OTUk from the ODUk received through the ODU switch 6. In addition, each framer 11 may generate the OTU4V from the ODU4 by the GMP, and generates the OTU4CnV (i.e. plural OTL4CnV.n) from the ODU4Cn (i.e. plural ODL4Cn.n) by the GMP.

Each DSP 12 generates a driving signal for generating a DP-QPSK optical signal, from the OTUk generated by the corresponding framer 11. At this time, the DSP 12 generates an X component signal of the H polarization, a Q component of the H polarization, an I component signal of the V polarization, and a Q component of the V polarization.

Each optical module 13 includes an optical transmitter 13T and an optical receiver 13R. The optical transmitter 13T modulates a carrier light using the driving signal generated by the corresponding DSP 12 so as to generate a DP-QPSK optical signal. The optical modules 13a, 13b generate the DP-QPSK optical signals using subcarriers having different wavelengths. The DP-QPSK optical signals generated by the optical modules 13a, 13b are multiplexed by a WDM device (not illustrated), and are transmitted to the network.

In each optical module 13, the optical, receiver 13R demodulates the modulated optical signal of the corresponding subcarrier so as to recover the transmission data. The DSP 12 reproduces the OTUk from the transmission data recovered by the corresponding optical module 13. The framer 11 demaps the OTUk reproduced by the corresponding DSP12 to the ODUk. The ODUk reproduced by the framer 11 is guided to the client card 2 or to another network card via the ODU switch 6.

The network card illustrated in FIG. 7B includes the framers 11 (11a to 11d), the DSPs 12 (12a, 12b), and the optical, modules 13 (13a, 13b). Each framer 11 generates the OTUk from the ODUk received via the ODU switch 6. In addition, each framer 11 may generate the OTU4V from the ODU4 by the GMP, and generates the OTL4CnV (i.e. plural OTL4CnV.n) from the ODU4Cn (i.e. plural ODL4Cn.n) by the GMP.

Each DSP 12 generates a driving signal for generating the DP-16QAM optical signal, from the OTUk generated by the two corresponding framers 11. At this time, the DSP 12 generates the I component signal of the H polarization, the Q component signal of the H polarization, the I component signal of the V polarization, and the Q component signal of the V polarization.

Each optical module 13 has substantially the same configuration and operation as those of the optical module 13 illustrated in FIG. 7A. However, the optical module 13 illustrated in FIG. 7B modulates a carrier light with the driving signal generated by the corresponding DSP 12 so as to generate the DP-16QAM optical signal.

Each optical module 13 demodulates the modulated optical signal of the corresponding subcarrier so as to recover the transmission data. The DSP12 reproduces a pair of the OTUk from the transmission data recovered by the corresponding optical module 13. The framer 11 demaps one of the pair of the OTUk reproduced by the corresponding DSP12 to the ODUk. The ODUk reproduced by the framer 11 is guided to the client card 2 or to another network card via the ODU switch 6.

The network card illustrated in FIG. 7C includes the framer 11, the DSPs 12 (12a, 12b), and the optical modules 13 (13a, 13b). The framer 11 generates the OTUk from the ODUk received via the ODU switch 6. In addition, the framer 11 may generate the OTU4V from the ODU4 by the GMP, and generates the OTL4CnV (i.e. plural OTL4CnV.n) from the ODU4Cn (i.e. plural ODL4Cn.n) by the GMP.

Each DSP 12 generates a driving signal for generating the DP-BPSK optical signal, from the OTUk generated by the framer 11. At this time, the DSP 12 generates the H polarization signal and the V polarization signal.

The optical module 13 has substantially the same configuration and operation as those of the optical module 13 in FIG. 7A or 7B. The optical module 13 illustrated in FIG. 7C, however, modulates a carrier light by the driving signal generated by the corresponding DSP 12 so as to generate the DP-BPSK optical signal.

One or a plurality of network cards 7 are implemented in the transmission equipment 1. For example, in order to generate an optical signal to be transmitted to the node equipment NE#2, the node equipment NE#1 illustrated in FIG. 4 has two network cards 7 illustrated in FIG. 7A. Each network card 7 illustrated in FIG. 7A generates two DP-QPSK optical signals, and transmits these optical signals on subcarriers having different wavelengths. Accordingly, the node equipment NE#1 having two network cards 7 illustrated in FIG. 7A can generate four DP-QPSK optical signals and transmit these optical signals on the subcarriers having different wavelengths.

In order to generate an optical signal to be transmitted to the node equipment NE#3, the node equipment NE#2 illustrated in FIG. 4 has one network card 7 illustrated in FIG. 7B. The network card 7 illustrated in FIG. 7B generates two DP-16QAM optical signals. Accordingly, the node equipment NE#2 having one network card 7 illustrated in FIG. 7B can generate two DF-16QAM optical signals and transmit these optical signals.

In order to generate an optical signal to be transmitted to the node equipment NE#4, the node equipment NE#3 illustrated in FIG. 4 has four network cards 7 illustrated in FIG. 7C. The network card 7 illustrated in FIG. 7C generates two DP-BPSK optical signals and transmits these optical signals on sub-carriers having different wavelengths. Accordingly, the node equipment NE#3 having four network cards 7 illustrated in FIG. 7C can generate eight DP-BPSK optical signals and transmit these optical signals on the subcarriers having different wavelengths.

The number of network cards 7 and the configuration of the network cards 7 implemented in the transmission equipment 1 are not limited to those in the aforementioned examples. The number of network cards 7 and the configuration of the network cards 7 implemented in the transmission equipment 1 may be decided depending on the required transmission capacity and the transmission distance or the like.

Figure 8:
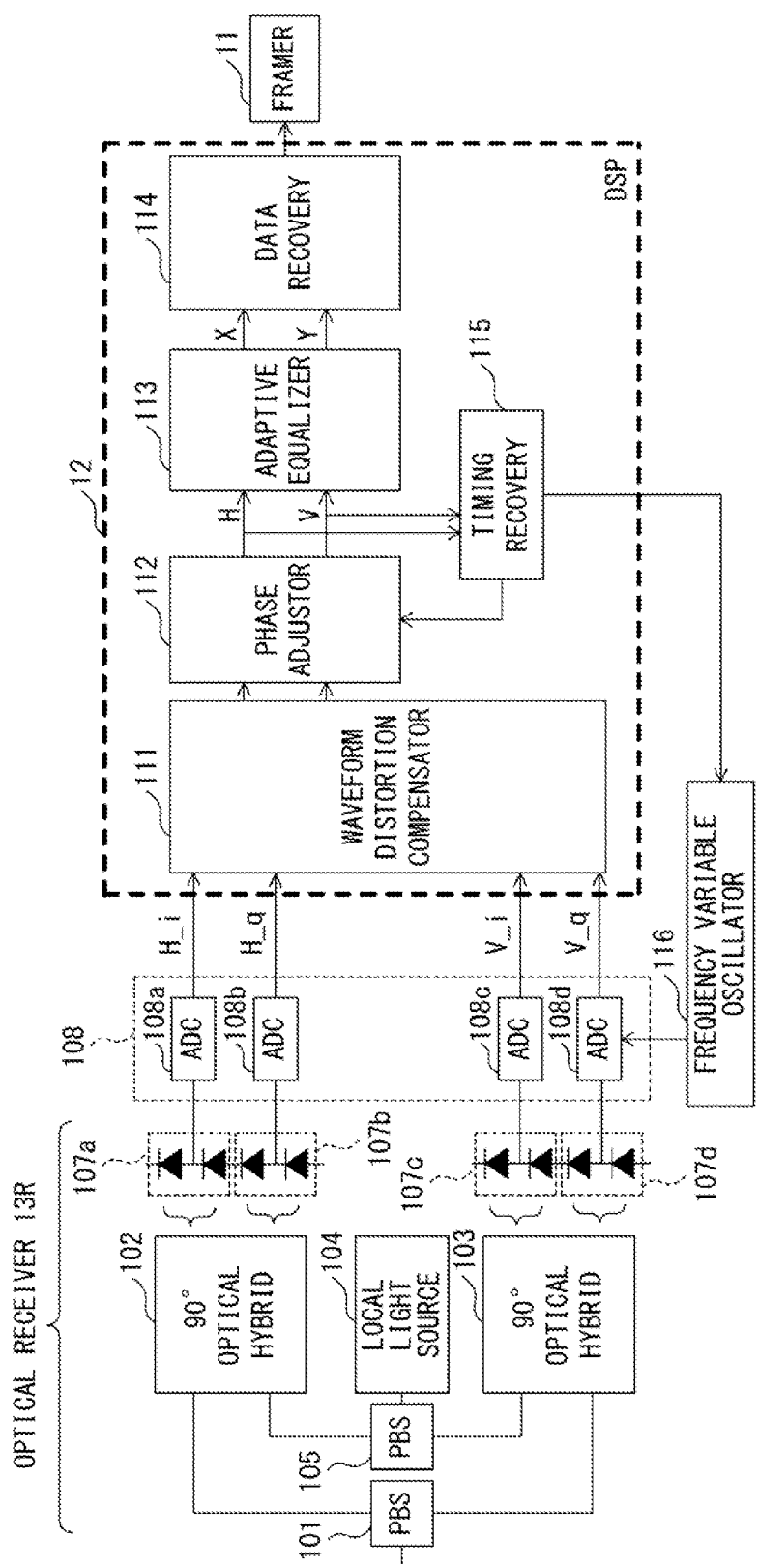
FIG. 8 illustrates an example of a circuit for receiving an optical signal.

FIG. 8 illustrates an example of a circuit that receives an optical signal. This circuit includes the optical receiver 13R and the DSP 12 illustrated in FIGS. 7A-7C.

The received optical signal is split into the H polarized wave and the V polarized wave by a polarization beam splitter 201, and these waves are guided to 90° optical hybrid circuits 102 and 103, respectively. A local oscillation light generated by a local light source 104 is also split by a polarization beam splitter 105, and are guided to the 90° optical hybrid circuits 102 and 103, respectively. The 90° optical hybrid circuit 102 mixes the H polarized wave of the received optical signal and the local oscillation light so as to output the I component optical, signal and the Q component optical signal. The I component optical signal and the Q component optical signal that are output from the 90° optical hybrid circuit 102 are converted into electrical signals by photo detectors 107a and 107b, and farther converted into digital signals by A/D converters 108a, 108b. In this manner, the I component signal of the H polarization and the Q component signal of the H polarization are generated. Similarly, the I component signal of the V polarization and the Q component signal of the V polarization are generated by the 90° optical hybrid circuit 103, photo detectors 107c and 107d, and A/D converters 108c and 108d.

The DSP 12 includes a waveform distortion compensator 111, a phase adjuster 112, an adaptive equalizer 113, a data recovery 114, and a timing recovery 115. The waveform distortion compensator 111 compensates for distortions of the I component signal of the H polarization, the Q component signal of the H polarization, the I component signal of the V polarization, and the Q component signal of the V polarization, and outputs the H polarization signal and the V polarization signal. The phase adjuster 112 adjusts the phases of the H polarization signal and the V polarization signal. The adaptive equalizer 113 equalizes the H polarization signal and the V polarization signal so as to obtain an X component signal and a Y component signal. The X component signal and the Y component signal represent symbol strings transmitted from the optical transmitter. Based on the X component signal and the Y component signal, the data recovery 114 carries out data decision for each symbol, thereby reproducing a pair of data strings (i.e. data strings transmitted on the H polarization, and data string transmitted on the V polarization). The data strings reproduced in this manner are guided to the framer 11.

The transmitting node equipment transmits the OTUk frame using the modulated optical signal. Hence, the data string reproduced by the circuit illustrated in FIG. 8 represents the OTUk frame generated by the transmitting node equipment. Thus, the framer 11 illustrated in FIG. 8 is provided with an OTUk frame signal.

The timing recovery 115 controls the operation of the phase adjuster 112 based on the H polarization signal and the V polarization signal generated by the phase adjuster 112. The timing recovery 115 may control the frequency of a frequency variable oscillator 116 using the control signal obtained in the feedback system. The frequency variable oscillator 116 generates sampling clocks of the A/D converters 108a to 108d.

In the receiving circuit having the above configuration, in order to enhance accuracy of the data recovery, signals input into the DSP 12 (H_i, H_q, V_i, V_q,) are preferably synchronized with one another. According to the transmission method of the present embodiment, the mapping from the ODUk to the OTUkV is carried out such that the four signals (H_i, H_q, V_i, V_q,) illustrated in FIG. 8 are to be synchronized with one another, as described in detail later. Accordingly, in the data transmission carried out using the transmission method of the present embodiment, the accuracy of the data recovery can be improved.

FIG. 9A and FIG. 9B are drawings explaining the processing of mapping the client signal to the OTN frame. 100 G client signal illustrated in FIG. 9A represents a data signal of approximately 100 Gbps. B100 G (beyond 100 Gbps) client signal illustrated in FIG. 9B represents a data signal of more than 100 Gbps.

When the transmission equipment 1 receives the 100 G client signal, the mapper 4 maps the 100 G client signal to the OPU4 as illustrated in FIG. 9A. The bit rate of the OPU4 (or the frequency of the clock signal for processing the OPU4) is defined in the OTN. The framer 5 adds the overhead to the OPU4 so as to generate the ODU4 frame. The bit rate of the ODU4 frame (or the frequency of the clock signal for processing the ODU4 frame) is also defined in the OTN. The framer 11 generates the OTU4V frame from the ODU4 frame by the GMP (asynchronous GMP or bit-synchronous GMP). The method of generating the clock signal for processing the OTU4V frame is different between the asynchronous GMP and the bit-synchronous GMP.

When the transmission equipment 1 receives n 100 G client signals #1 to #n, the mapper 4 generates n OPU4s, the framer 5 generates n ODU4 frames #1 to #n, and the framer 11 generates n OTU4V frames #1 to #n. At this time, the ODU4 frames #1 to #n are processed in parallel, and the OTU4V frames #1 to #n are also processed in parallel. The n OTU4V frames #1 to #n are generated using a common clock. Accordingly, the n OTU4V frames #1 to #n have the same bit rate, clock synchronization is established among the n OTU4V frames #1 to #n.

When the transmission equipment 1 receives the B100G client signal, the mapper 4 maps this B100G client signal to the OPU4Cn as illustrated in FIG. 9B, For example, if the bit rate of the B100G client signals is approximately 400 Gbps, the B100G client signal is mapped to the OPU4C4 (i.e. n=4). The bit rate of the OPU4Cn (or the frequency of the clock signal for processing the OPU4Cn) is n times higher than the bit rate of the OPU4.

The framer 5 adds the overhead to the OPU4Cn so as to generate the ODU4Cn frame. The bit rate of the ODU4Cn frame (or the frequency of the clock signal for processing the ODU4Cn frame) is n times higher than the bit rate of the ODU4 illustrated in FIG. 9A. It should be noted that the framer 5 outputs the n ODL4Cn.n subframes #1 to #n that are obtained by decomposing the ODU4Cn frame. At this time, the bit rate of the ODL4Cn.n subframes (or the frequency of the clock signal for processing the ODL4Cn.n subframes) is substantially the same as that of the ODU4.

The framer 11 generates the OTL4CnV.n subframes from respective ODL4Cn.n subframes by the GMP (asynchronous GMP or bit-synchronous GMP). At this time, the bit rate of each OTL4CnV.n subframe is substantially the same as that of the OTU4V frame illustrated in FIG. 9A.

When generating the plural OTL4CnV.n subframes #1 to #n for the purpose of transmitting the B100G client signal, the transmission equipment 1 can establish clock synchronization among these plural subframes. For example, if two OTL4CnV.n subframes #1 and #2 are transmitted on a pair of the polarized waves, the clock synchronization is established among the signals (H_i, H_q, V_i, V_q) illustrated in FIG. 8. In this case, the accuracy of the data recovery is improved in the receiving node of the client signal.

The bit rate of the frame for transmitting the 100G client signal (OTU4V frame in this case) and the bit rate of the frame for transmitting the B100G client signal (OTL4CnV.n subframes in this case) are substantially the same as each other. Accordingly, it is possible to simplify the configuration of the circuit for processing the frames in each transmission equipment. In addition, it is possible to commonly use the circuit for processing the frames. Accordingly, it is possible to reduce the production cost of the transmission equipment as well as to reduce the cost for establishing and maintaining the transmission system.

Next, an example of the processing of mapping the client signal to the OTN frame is described. In this case, it is assumed that the B100G client signal having a fixed bit rate is directly mapped to the OPU4Cn. The client signal may be mapped to the OPU4Cn via the ODUflex. Alternatively, the plural client signals may foe mapped to the OPU4Cn via the ODUflex.

It is assumed that the B100G client signal is 400GBASE-R. The 400GBASE-B is assumed to be generated by encoding a signal, of 400 Gbps±100 ppm using a 66B/64B code. The 400GBASE-R is directly mapped to the OPU4C4. In this case, each bit rate of 400GBASE-R, ODU4Cn, OPU4Cn payload, ODTU4Cn.ts is as illustrated in FIG. 10A. As illustrated in the FIG. 10A, the ODU4Cn has a bit rate n times higher than the bit rate of the ODU4. The OPU4Cn payload has a bit rate n times higher than the bit rate of the OPU4 payload.

The client signal is mapped to the OPU4C4 by the GMP. If the client signal is mapped to the OPU4, "m" of Cm is 640. Hence if the client signal is mapped to the OPU4C4, "m" is 2560 (=640×4). In this case, Cm is as illustrated in FIG. 10B. Note that Cm is one of parameters for specifying the operation of the GMP, and represents the number of m-bit client data entities.

It is assumed that "n" of Cn is 8, as similar to the OPU4. In this case, Cn is as illustrated in FIG. 10C. Note that Cn is one of the parameters for specifying the operation of the GMP, and represents the number of n-bit client data entities.

FIG. 10D represents the frame configuration of the OPU4Cn to which the client signal is mapped. In this case, because the client signal is 400GBASE-R, the client signal is mapped to the OPU4C4, The OPU4C4 frame is processed in four OPL4C4.4 subframes. FIG. 10D illustrates one of the four OPL4C4.4 subframes, and each OPL4C4.4 subframe has the same configuration. A staff of 8 columns×4 rows is fixedly inserted in each OPL4C4.4 subframe. This stuff is inserted so as to adjust or absorb frequency deviation between the clock of the input signal (client signal in this case) and the clock of an output signal (signal of the OPU4C4 frame in this case). The ODU4Cn (ODL4Cn.n) is generated by adding the overhead to the OPU4Cn (OPL4Cn.n). The OTU4CnV (OTL4CnV.n) is generated by adding FEC or the like to the ODU4Cn (ODL4Cn.n).

The configuration and operation of the framer for carrying out the mapping between the ODUk and the OTUk will be described as follows. In the following description, the framer carries out the mapping between the ODU4 and the OTU4V, or the mapping between the ODL4Cn.n and the OTL4CnV.n.

Figure 11:
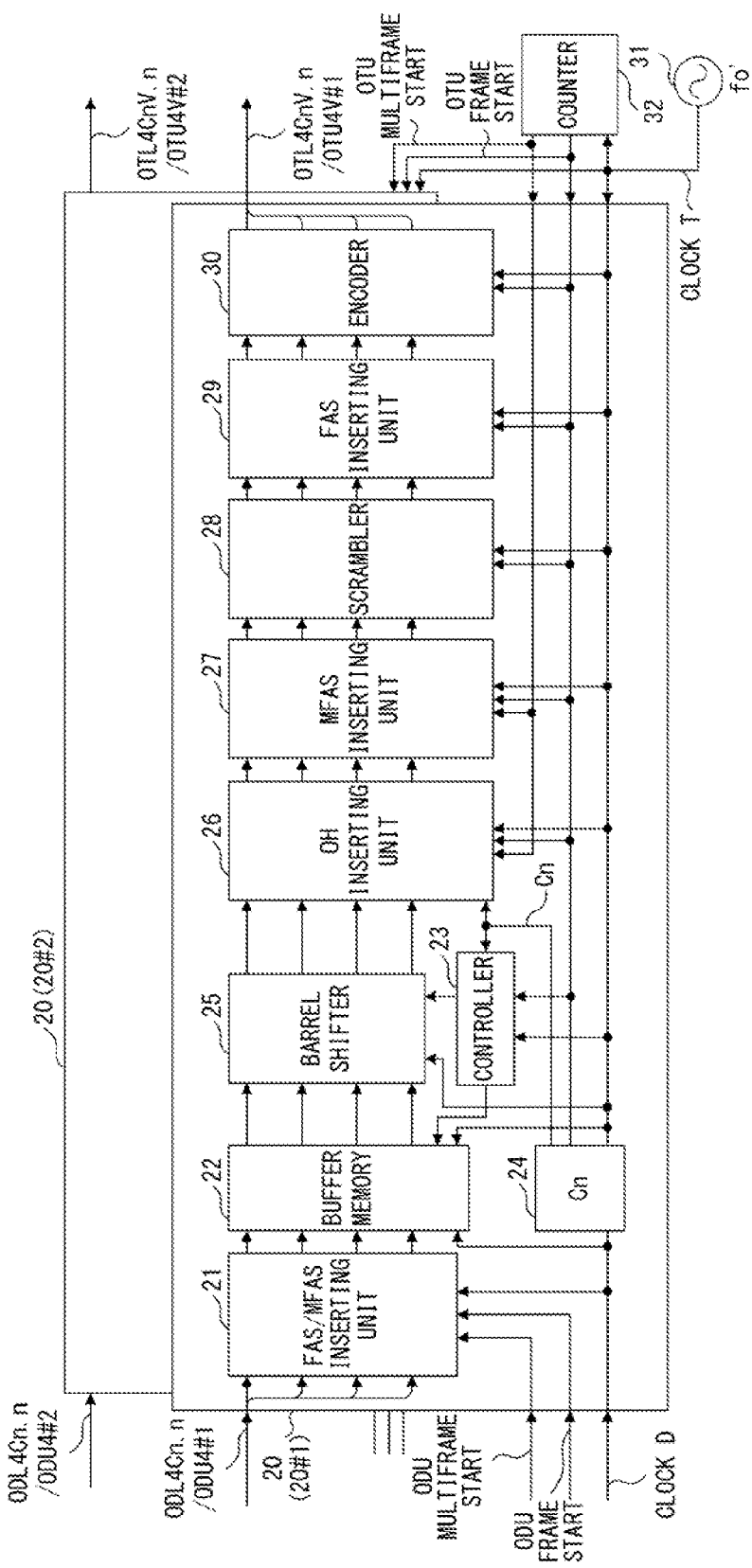
FIG. 11 illustrates a circuit for mapping ODUk to OTUkV by asynchronous GMP.

FIG. 11 illustrates an example of a circuit for mapping the ODUk to the OTUkV by the asynchronous GMP. The mapping circuit illustrated in FIG. 11 includes two framers 20 (20#1, 20#2) for processing two frames (or two subframes) in parallel. Each framer 20 corresponds to the framer 11, or a part of the framer 11 illustrated in FIG. 7A to FIG. 7C, FIG. 9A, or FIG. 9B, for example.

The ODL4Cn.n subframe data or the ODU4 frame data is inputted lute each framer 20. The ODL4Cn.n subframe has the same bit rate as that of the ODU4 frame, as described above. For example, 512-bit parallel processing is carried out in the framer 20. In the following description, the ODL4Cn.n subframes or the ODD4 frame may also be referred to as an "ODL4Cn.n/ODU4 frame" or "ODL4Cn.n/ODU4 data". The OTL4CnV.n subframes or the OTU4V frame that are generated by the framer 20 may also be referred to as an "OTL4CnV.n/OTU4V frame" or an "OTL4CnV.n/OTU4V data".

A signal transmitted in the form of a frame or a subframe pertinent to the OTN may be referred as a "frame signal". Thus, the signal transmitted in the ODL4Cn.n/ODU4 frame is an example of the frame signal. In addition, a signal transmitted in the OTL4CnV.n/OTU4V frame is also an example of the frame signal.

As illustrated in FIG. 11, the framer 20 includes an FAS/MFAS inserting unit 21, a buffer memory 22, a controller 23, a Cn detector 24, a barrel shifter circuit 25, an overhead inserting unit 26, an MFAS inserting unit 27, a scrambler 28, an FAS inserting unit 29, and an encoder 30. A clock generator 31 and a frame counter 32 are commonly provided for the plural framers 20 (20#1, 20#2).

An ODU frame start signal indicates start timing of the ODL4Cn.n/ODU4 frame. An ODU multiframe start signal indicates start timing of the multiframes generated from the plural ODL4Cn.n/ODU4 frames. The ODU frame start signal and the ODU multiframe start signal are generated by the framer 5 illustrated in FIG. 6, for example.

The FAS/MFAS inserting unit 21 inserts FAS/MFAS into the ODL4Cn.n/ODU4 frame. At this time, the FAS/MFAS inserting unit 21 decides timing to insert the FAS/MFAS into the ODL4Cn.n/ODU4 frame based on the ODU frame start signal and the ODU multiframe start signal.

The ODL4Cn.n/ODU4 frame output from the FAS/MFAS inserting unit 21 is written on the buffer memory 22. At this time, the ODL4Cn.n/ODU4 frame is written on the buffer memory 22 using a clock signal D. The clock signal B is a clock for the ODL4Cn.n/ODU4 frame.

The controller 23 reads out the signal written on the buffer memory 22 (i.e. ODL4Cn.n/ODU4 frame) using a clock signal T. The clock signal T is generated by the clock generator 31. The frequency $f_0'$ of the clock signal T is defined in advance based on the format of the OTL4CnV.n/OTU4V frame output from the framer 20, for example. The frequency $f_0'$ of the clock signal T is defined to be higher than the frequency of the clock signal D.

The Cn detector 24 detects the Cn value of the GMP for each OTL4CnV.n/OTU4V frame. The Cn value represents the number of bytes of data input into the framer 20 within the frame period on the output side of the framer 20. The Cn detector 24 informs the controller 23 and the overhead inserting unit 26 of the detected Cn value. The method of detecting the Cn value in the OTN is feasible by using a well-known technique, and thus detailed description thereof will be omitted.

The barrel shifter circuit 25 maps the ODL4Cn.n/ODU4 frame read out from the buffer memory 22 to the pay load of the OTL4Cn.n/OTU4V frame. At this time, the controller 23 generates a read-out enable signal for reading out a signal from the buffer memory 22, and a control signal for controlling the shift operating of the barrel shifter circuit 25.

The overhead inserting unit 26 calculates the Cm value and a ΣCnD value from the Cn value for every OTL4CnV.n/OTU4V frame. The Cm value is obtained by dividing the Cn value by "m/n". It is assumed that "m/n" is predefined and provided for the framer 20 in advance. For example, in the case of C=15217, and m/n=16, the Cn value is divided by "m/n", thereby obtaining "951 with 1 remainder". In this case, Cm is "951". The "remainder" obtained by dividing the Cn value by "m/n" is cumulatively added, thereby obtaining the ΣCnD value. The method of calculating the Cm value and the ΣCnD value based on the Cn value in the OTN is feasible by using a well-known technique, and thus detailed description thereof will be omitted.

The overhead inserting unit 26 may decide the volume of the stuff to be inserted in the OTL4CnV.n/OTU4V frame based on the Cm value and the ΣCnD value. In this case, the overhead inserting unit 26 may insert the decided volume of stuff into the OTL4CnV.n/OTU4V frame. The insertion of the stuff may, however, be executed by another circuit element in the framer 20.

The overhead inserting unit 26 inserts the calculated Cm value and ΣCnD value into JC1 to JC3, and JC4 to JC6 of the overhead. The overhead inserting unit 26 also inserts another overhead information into the OTL4CnV.n/OTU4V frame. At this time, the overhead inserting unit 26 may set information for identifying the asynchronous GMP or the bit-synchronous GMP as the overhead information. This information may be set in PT-PSI information, for example. In the mapping circuit illustrated in FIG. 11, a value for identifying the asynchronous GMP is set.

The MFAS inserting unit 27 inserts MFAS into the OTL4CnV.n/OTU4V frame. The scrambler 28 scrambles the OTL4CnV.n/OTU4V frame data using a specified generating polynomial, for example. The generating polynomial is defined by the OTN. The FAS inserting unit 29 inserts FAS into the OTL4CnV.n/OTU4V frame. The encoder 30 generates FEC, and adds the FEC to the OTL4CnV.n/OTU4V frame.

The processing order executed by the scrambler 28, the FAS inserting unit 29, and the encoder 30 depends on the specification of the FEC to be used. The FEC may be separately added to each OTL4CnV.n/OTU4V frame, or the FEC may be added to the plural OTL4CnV.n/OTU4V frames generated by the plural framers 20 (20#1, 20#2).

The clock generator 31 generates the clock signal T for processing the OTL4CnV.n/OTU4V frame. This clock is provided for each framer 20 (20#1, 20=2). That is, the plural framers 20 (20#1, 20#2) process the OTL4CnV.n/OTU4V frames using the common clock. Hence, clock synchronizing is established among the OTL4CnV.n/OTU4V frames generated by the plural framers 20 (20#1, 20#2).

The frame counter 32 counts the clock signal T generated by the clock generator 31, thereby detecting the OTL4CnV.n/OTU4V frames and their multiframes. The frame counter 32 generates an OTU frame start signal and an OTU multiframe start signal that represent respective start timings of the detected frame and multiframe. These signals are commonly used in the plural framers 20 (20#1, 20#2).

Figure 12:
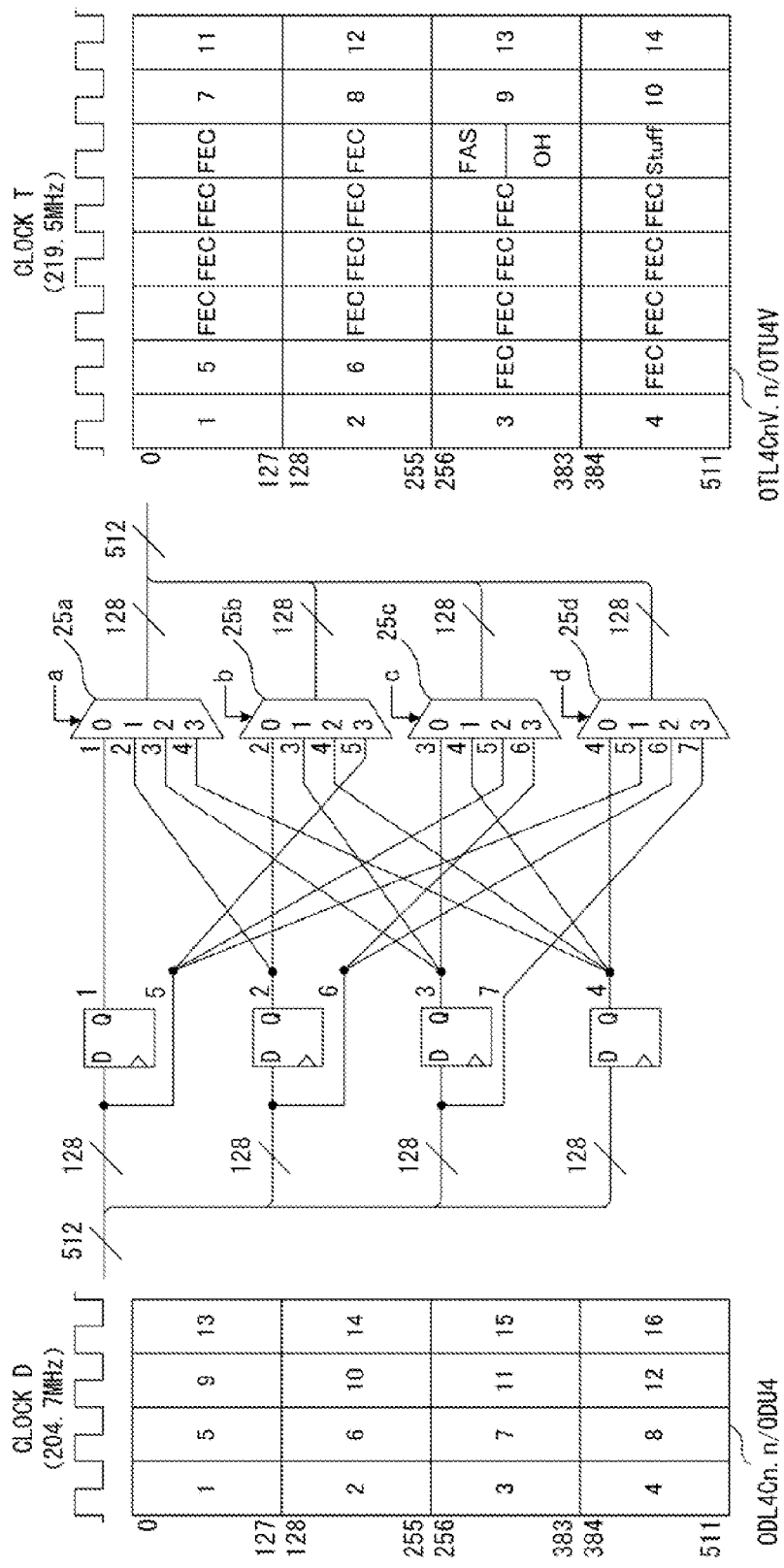
FIG. 12 illustrates an example of mapping ODUk to OTUkV.

FIG. 12 illustrates an example of the mapping from the ODUk to the OTUkV. This mapping processing is executed by the buffer memory 22, the controller 23, and the barrel shifter circuit 20 illustrated in FIG. 11. In this example, a 512-bit parallel processing is carried out.

The ODL4Cn.n/ODU4 frame read out from the buffer memory 22 is processed in four 128-bit data blocks in the barrel shifter circuit 25. Each 128-bit data block is respectively guided to the selectors 25a to 25d. Each of the selectors 25a to 25d selects a corresponding 128-bit data block depending on the control signals a-d from the controller 23.

FEC is inserted at a tail of the frame. In the example illustrated in FIG. 12, 256-byte FEC is inserted. A 16-byte overhead (including FAS; is inserted at a head of a next frame. In addition, a 16-byte stuff is inserted to a specified position if necessary. When the FEC, the overhead, and the stuff are inserted into the frame, the processing of reading out the ODL4Cn.n/ODU4 frame from the buffer memory 22 is stopped by the controller 23.

The frequency of the clock signal (clock signal D in FIG. 11) for writing the ODL4Cn.n/ODU4 data on the buffer memory 22 is as described below, for example.

Frequency=(239/227)×995328007512 [kHz]=204.7 [MHz]

In this case, for example, if RS (255, 239) is employed, the frequency of the clock signal (clock signal T generated by the clock generator 31 in FIG. 11) for reading out data from the buffer memory 22 is as follows.

Frequency=(4080/3804)×(239/227)×99532800/512 [kHz]=219.5 [MHz]

Figure 13:
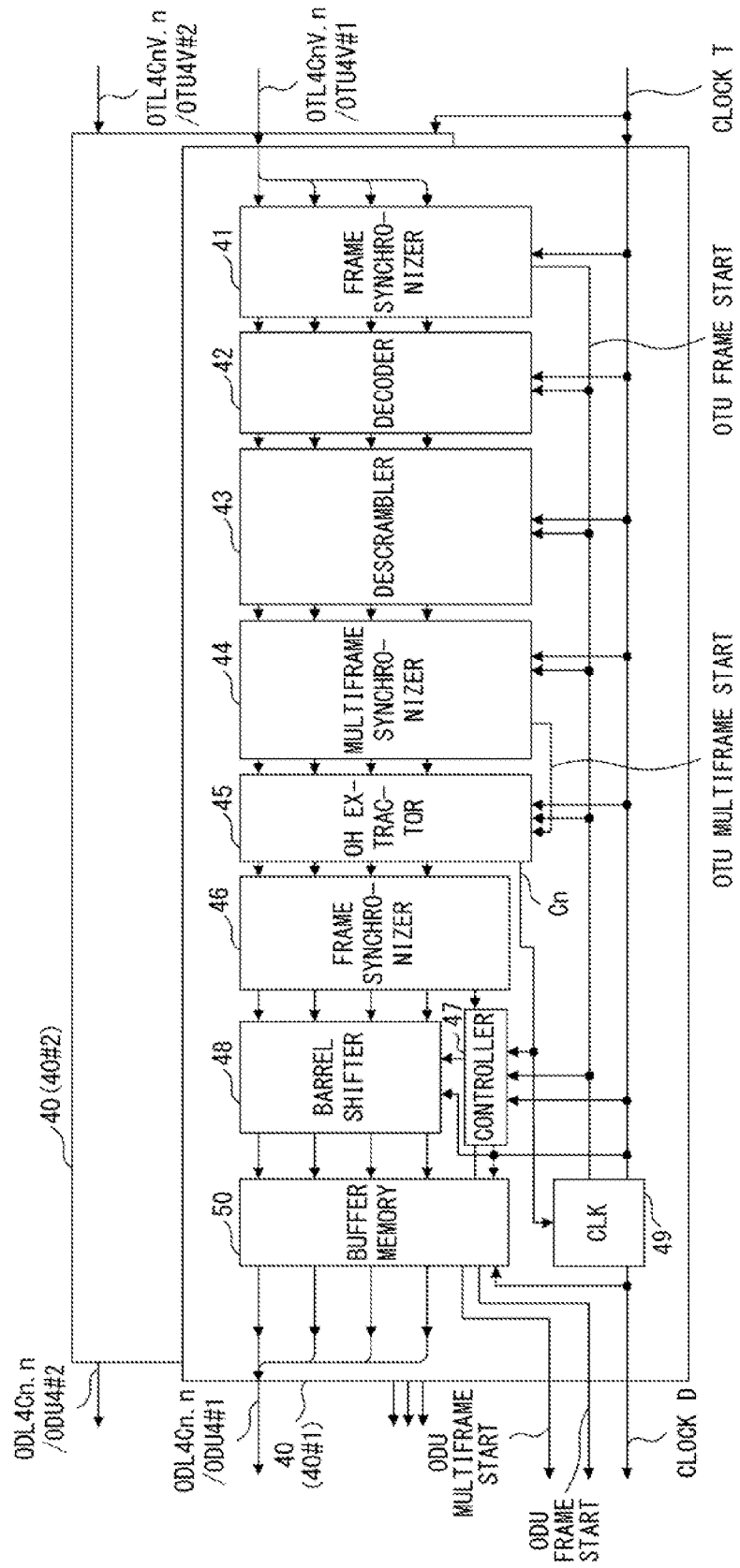
FIG. 13 illustrates a circuit for demapping OTUkV into ODUk by the asynchronous GMP.

FIG. 13 illustrates an example of a circuit for demapping the OTUkV to the ODUk by the asynchronous GMP. The demapping circuit illustrated in FIG. 13 includes two framers 40 (40#1, 40#2) so as to process two frames (or two sub-frames) in parallel. Each framer 40 corresponds to the framer 11 or a part of the framer 11 illustrated in FIG. 7A-7C, 9A, or 9B, for example. The framer 40 illustrated in FIG. 13 demaps the OTL4CnV.n/OTU4V frame generated by the framer 20 illustrated in FIG. 11 to the ODL4Cn.n/ODU4 frame, for example. Hence, the operation of the framer 40 corresponds to the mapping processing performed by the framer 20.

As illustrated in FIG. 13, the framer 40 includes a frame synchronizer 41, a decoder 42, a descrambler 43, a multi-frame synchronizer 44, an overhead extractor 45, a frame synchronizer 46, a controller 47, a barrel shifter circuit 48, a clock generator 49, and a buffer memory 50.

The frame synchronizer 41 establishes frame synchronization by detecting the FAS from the input OTL4CnV.n/OTU4V frame. The frame synchronizer 41 may also establish multiframe synchronization by using the MFAS. If the FEC is added to a plurality of OTL4CnV.n/OTU4V frames transmitted in parallel, the frame synchronizer 41 may execute the deskew processing for compensating for skew among the frames. The OTL4CnV.n/OTU4V frame is reproduced in the DSP 12 illustrated in FIG. 7A-7C, or 8, for example.

The decoder 42 decodes the FEC in the input OTL4CnV.n./OTU4V frame and executes the correction processing. The descrambler 43 executes the descrambling processing corresponding to the scrambling processing by the scrambler 28 illustrated in FIG. 11. The multiframe synchronizer 44 establishes multiframe synchronization.

The overhead extractor 45 extracts the overhead from the input OTL4CnV.n/OTU4V frame. At this time, the overhead extractor 45 detects information for identifying the asynchronous GMP or the bit-synchronous GMP that is set in the PT-PSI. The overhead extractor 45 checks whether or not the PT-PSI information identifies the asynchronous GMP. The overhead extractor 45 further acquires the Cm value and the ΣCnD value from JC 1 to JC 3, JC 4 to JC 6 in the overhead so as to calculate the Cn value.

The frame synchronizer 45 detects the FAS of the ODL4Cn.n/ODU4 frame accommodated in the payload of the input OTL4CnV.n/OTU4V frame. The frame synchronizer 46 informs the controller 47 of an FAS position signal indicating the position of the detected FAS.

The barrel shifter circuit 48 extracts the ODL4Cn.n/ODU4 frame accommodated in the payload of the input OTL4CnV.n/OTU4V frame. At this time, under control of the controller 47, the barrel shifter circuit 46 executes the shift processing such that the head of the frame (i.e. FAS) detected by the frame synchronizer 46 is allocated to the MSB in the parallel processing.

The controller 47 controls the barrel shifter circuit 48 as aforementioned. The controller 47 provides a write enable signal for the buffer memory 50 based on the Cn value obtained by the overhead extractor 45, and the FAS position signal obtained by the frame synchronizer 46.

The clock generator 49 generates the clock signal D based on the clock signal T synchronized with the input OTL4CnV.n/OTU4V frame and the Cn value obtained by the overhead extractor 45. The clock signal D is used for processing the ODL4Cn.n/ODU4 frame. Specifically, data stored on the buffer memory 50 is read out using this clock signal D. The ODL4Cn.n/ODU4 frame is obtained in this manner.

Figure 14:
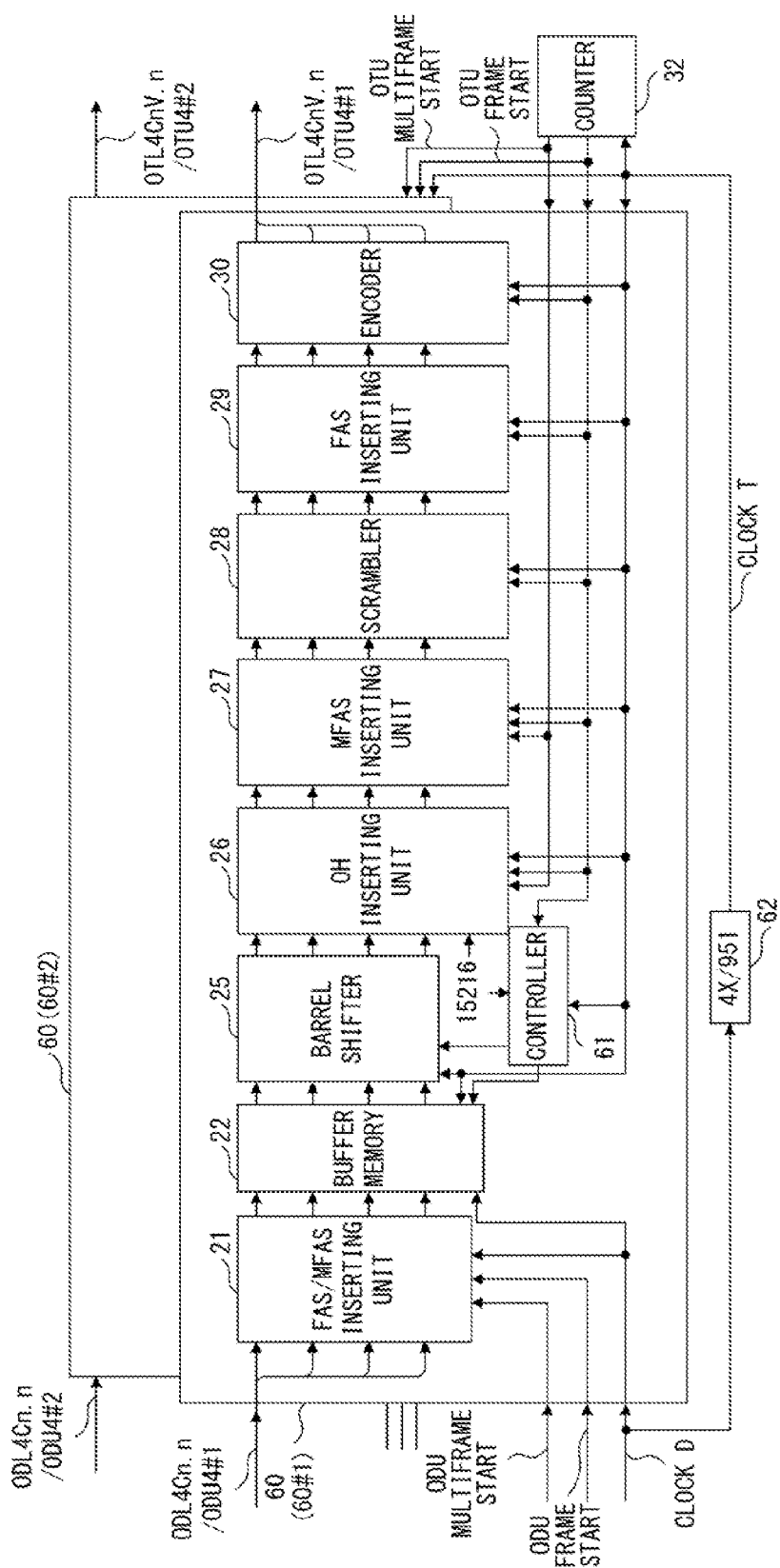
FIG. 14 illustrates a circuit for mapping ODUk to OTUkV by bit-synchronous GMP.

FIG. 14 illustrates an example of a circuit for mapping the ODUk to the OTUkv by the bit-synchronous GMP. The circuit illustrated in FIG. 14 includes two framers 69 (60#1, 60#2) so as to process two frames (or two subframes) in parallel. Each framer 60 corresponds to the framer 11 or a part of the framer 11 illustrated in FIG. 7A-7C, 9A, or 9B, for example.

In the present example, it is assumed that the ODL4Cn.n./ODU4 frame #1 input in the framer 60#1, and the ODL4Cn.n/ODU4 frame #2 input in the framer 60#2 are generated using the same clock signal. Specifically, clock synchronization is established between the ODL4Cn.n/ODU4 frames #1 and #2. For example, plural ODL4Cn.n subframes corresponding to the ODU4Cn frame are generated using the same clock signal.

As illustrated in FIG. 14, the framer 60 includes the FAS/MFAS inserting unit 21, the buffer memory 22, the barrel shifter circuit 25, the overhead inserting unit 26, the MFAS inserting unit 27, the scrambler 28, the FAS inserting unit 29, the encoder 30, and a controller 61. A frame counter 32 and a clock generator 62 are provided for the plurality of framers 60 (60#1, 60#2). The FAS/MFAS inserting unit 21, the buffer memory 22, the barrel shifter circuit 25, the overhead inserting unit 26, the MFAS inserting unit 27, the scrambler 28, the FAS inserting unit 29, the encoder 30, and the frame counter 32 has substantially the same configuration as those in FIG. 11.

The framer 60 that carries out the mapping by the bit-synchronous GMP includes no Cn detector 24 illustrated in FIG. 11. In the framer 60, the Cn value is a fixed value of 15216. Hence, based on Cn=15216, the controller 61 controls reading-out of data from the buffer memory 22, and also controls the operation of the barrel shifter circuit 25. In addition, the overhead inserting unit 26 inserts a stuff in the frame based on Cn=15216. In the bit-synchronous GMP in the present example, the 16-byte stuff is fixedly inserted into each frame.

The clock generator 62 generates the clock signal T from the clock signal D for processing the ODL4Cn.n/ODU4 frame. At this time, the clock signal T is generated by multiplying the frequency of the clock signal D by "4X/951". "X" is set based on the format of the OTL4CnV.n/OTU4V frame. Specifically, "X" is resulted from dividing the number of the columns of the OTL4CnV.n/OTU4V frame by 16, for example. For example, if the OTL4CnV.n/OTU4V frame has 4080 columns×4 rows, X=255 is obtained; and in this case, the clock generator 62 generates the clock signal T by multiplying the frequency of the clock signal D by "1020/951".

The framer 60 illustrated in FIG. 14 uses this clock signal T for the purpose of processing the OTL4CnV, n/OTU4V frame. The clock signal T is commonly used in the plural framers 60 (60#1, 60#2).

Figure 15:
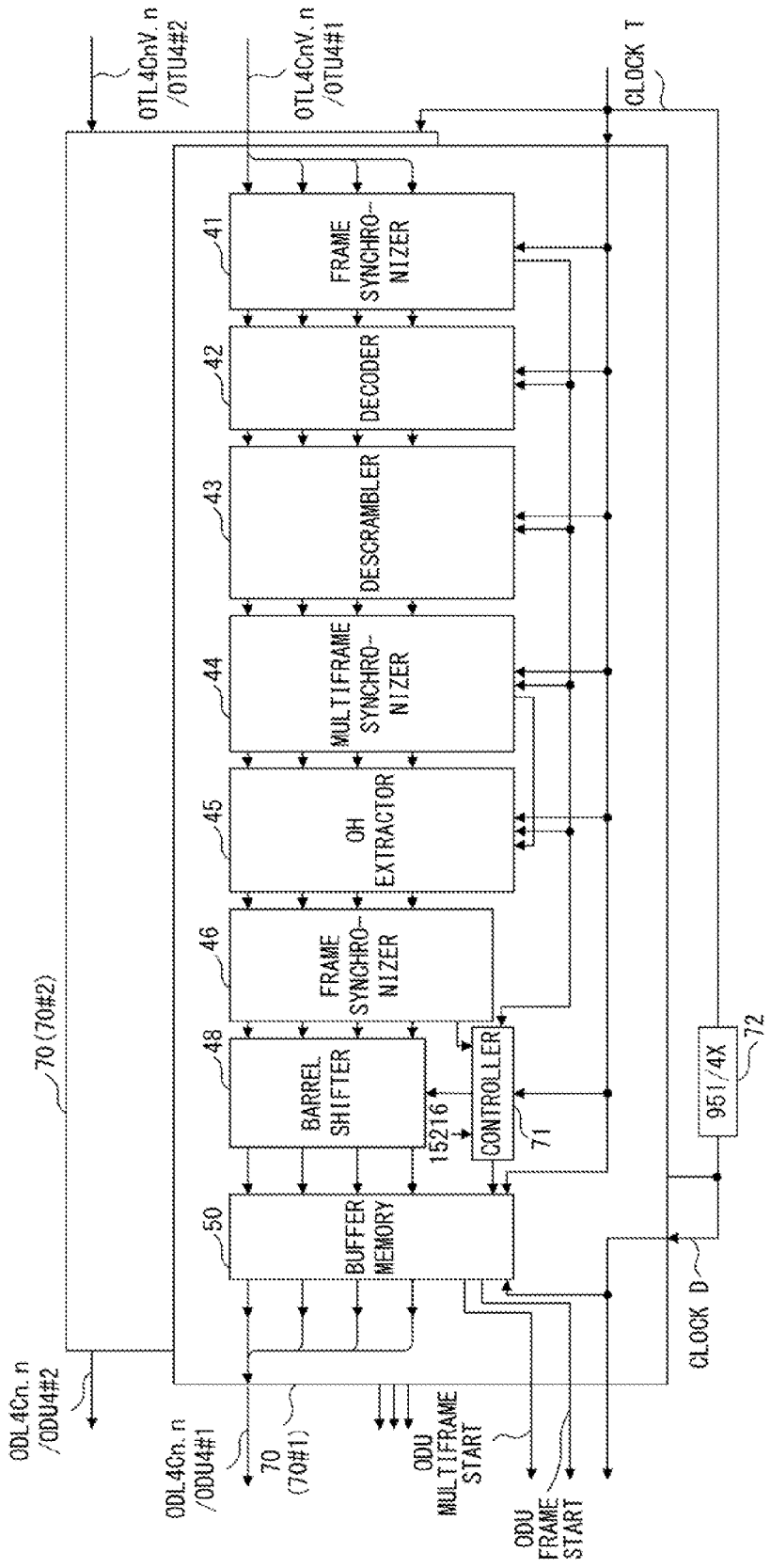
FIG. 15 illustrates a circuit for demapping OTUkV to ODUk by the bit-synchronous GMP.

FIG. 15 illustrates an example of a circuit for demapping the OTUkV to the ODUk by the bit-synchronous GMP. The demapping circuit illustrated in FIG. 15 includes two framers 70 (70#1, 70#2) for the purpose of processing two frames (or two subframes) in parallel. The framer 70 corresponds to the framer 11 or a part of the framer 11 illustrated in FIG. 7A-7C, 9A, or 9B, for example. The framer 70 illustrated in FIG. 15 receives a frame signal generated by the framer 60 illustrated in FIG. 14, for example.

As illustrated in FIG. 15, the framer 70 includes the frame synchronizer 41, the decoder 42, the descrambler 43, the multiframe synchronizer 44, the overhead extractor 45, the frame synchronizer 46, the barrel shifter circuit 48, the buffer memory 50, and the controller 71. The frame synchronizer 41, the decoder 42, the descrambler 43, the multiframe synchronizer 44, the overhead extractor 45, the frame synchronizer 46, the barrel shifter circuit 48, and the buffer memory 50 has substantially the same configuration as those illustrated in FIG. 13. A clock generator 72 is provided for the plurality of framers 70 (70#1, 70#2).

In the framer 70 carrying out the mapping by the bit-synchronous GMP, the Cn value is the fixed value of 15216. Hence, based on Cn=15216, the controller 71 controls the operation of the barrel shifter circuit 48, and also controls data writing on the buffer memory 50.

The clock generator 72 generates the clock signal D from the clock signal T for processing the OTL4CnV.n/OTU4V frame. At this time, the clock signal D is generated by multiplying the frequency of the clock signal T by "951/4X". "X" is as described with reference to FIG. 14.

In the framer 70 illustrated in FIG. 15, the clock signal D is used for the purpose of processing the ODL4Cn.n/ODU4 frame. The clock signal D is commonly used among the plural framers 70 (70#1, 70#2).

Figure 16:
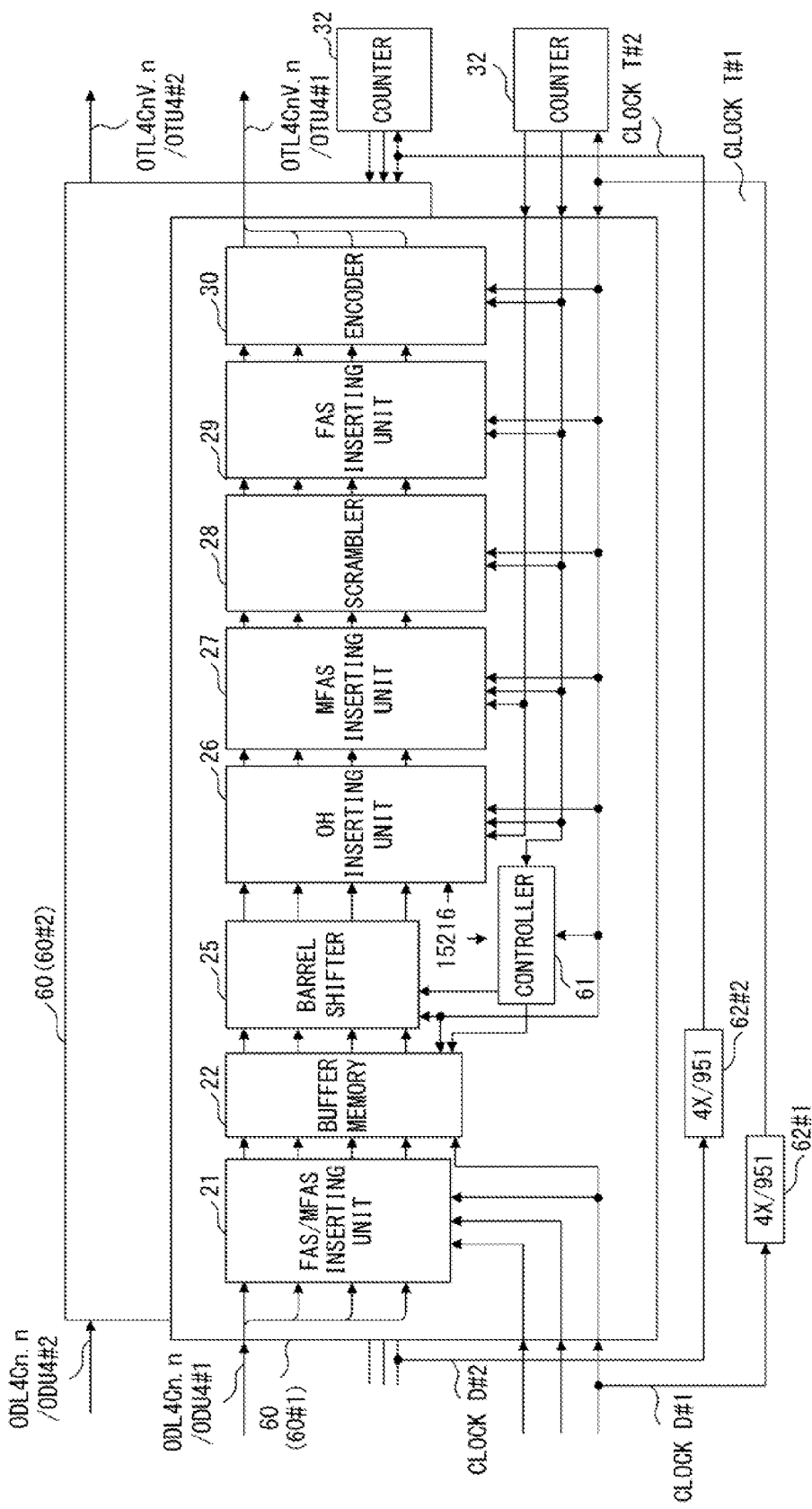
FIG. 16 illustrates a variation of the circuit illustrated in FIG. 14.

FIG. 16 illustrates another example of a circuit for mapping the ODUk to the OTUkV by the bit-synchronous GMP. The configuration of the framer 60 is substantially the same in FIG. 14 and FIG. 16. The configuration of generating the clock signal for reading out data from the buffer memory 22 is, however, different between the mapping circuits illustrated in FIG. 14 and FIG. 16. In the example of FIG. 16, a clock signal B#1 for processing the ODL4Cn.n/ODU4 frame #1 in the framer 60#1, and a clock signal D#2 for processing the ODL4Cn.n/ODU4 frame #2 in the framer 60#2 are independent from each other. Specifically, no clock synchronization is established between the ODL4Cn.n/ODU4 frames #1 and #2.

In the mapping circuit illustrated in FIG. 16, a clock generator 62#1 generates a clock signal T#1 by multiplying the frequency of the clock signal D#1 for processing the ODL4Cn.n/ODU4 frame #1 by "4X/951". The framer 60#1 processes the OTL4CnV.n/OTU4V frame using this clock signal T#1. Similarly, a clock generator 62#2 generates a clock signal T#2 by multiplying the frequency of the clock signal D#2 for processing the ODL4Cn.n/ODU4 frame #2 by "4X/951". The framer 60#2 processes the OTL4CnV.n/OTU4V frame using this clock signal T#2.

Figure 17:
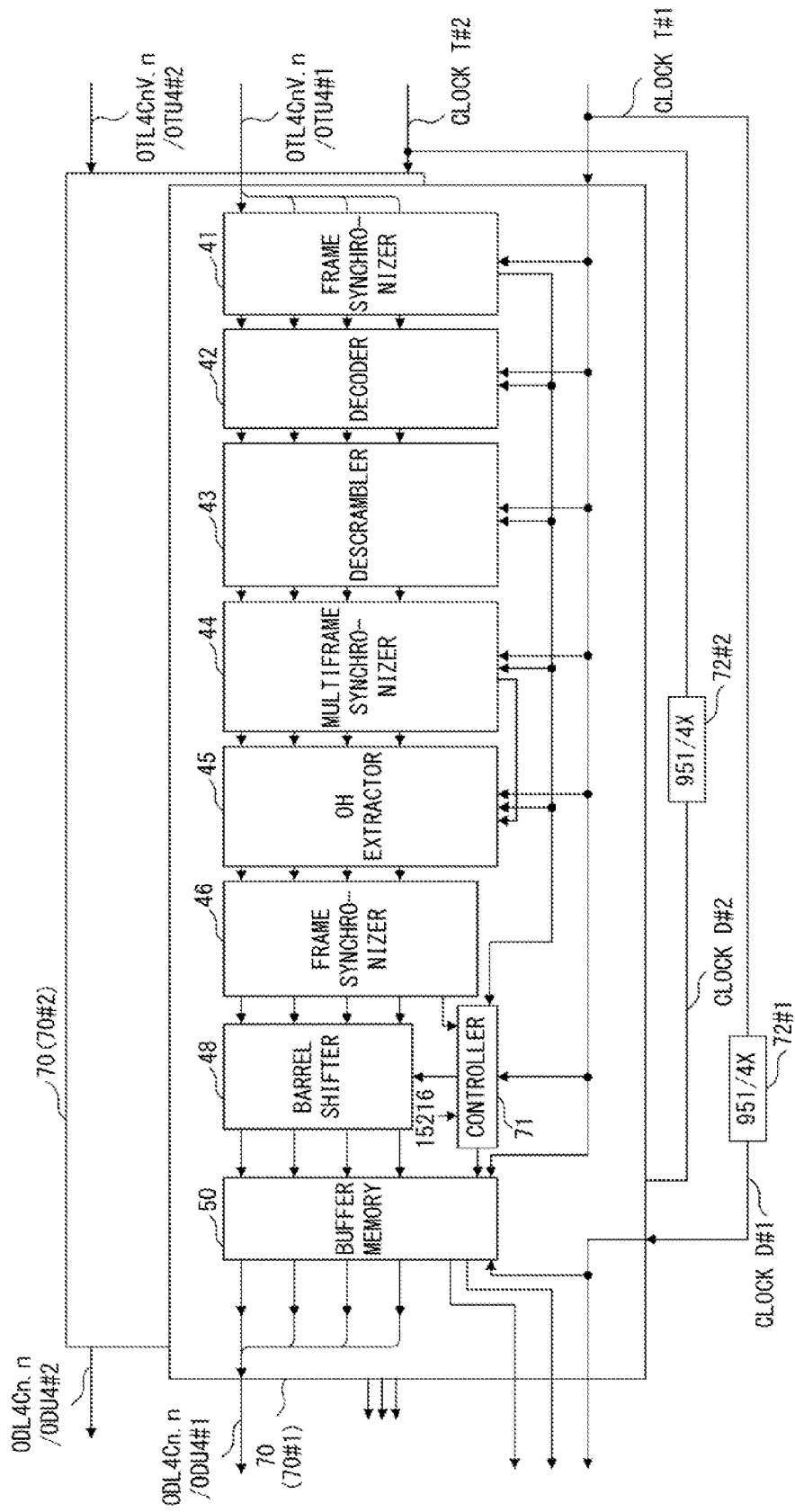
FIG. 17 illustrates a variation of the circuit illustrated in FIG. 15.

FIG. 17 illustrates another example of demapping the OTUkV to the ODUk by the bit-synchronous GMP. The configuration of the framer 70 is substantially the same in FIG. 15 and FIG. 17. The configuration of generating the clock signal for reading out data from the buffer memory 50 is, however, different between the demapping circuits illustrated in FIG. 15 and FIG. 17. The framer 70 illustrated in FIG. 17 receives the frame signal generated by the framer 60 illustrated in FIG. 16, for example.

In the demapping circuit illustrated in FIG. 17, a clock generator 72#1 generates the clock signal D#1 by multiplying the frequency of the clock signal T#1 for processing the OTL4CnV.n/OTU4V frame #1 by "951/4X". The framer 70#1 processes the ODL4Cn.n/ODU4 frame using this clock signal D#1. Similarly, a clock generator 72#2 generates a clock signal D#2 by multiplying the frequency of the clock signal T#2 for processing the OTL4CnV.n/OTU4V frame #2 by "951/4X". The framer 70#2 processes the ODL4Cn.n/ODU4 frame using this clock signal D#2.

Figure 18:
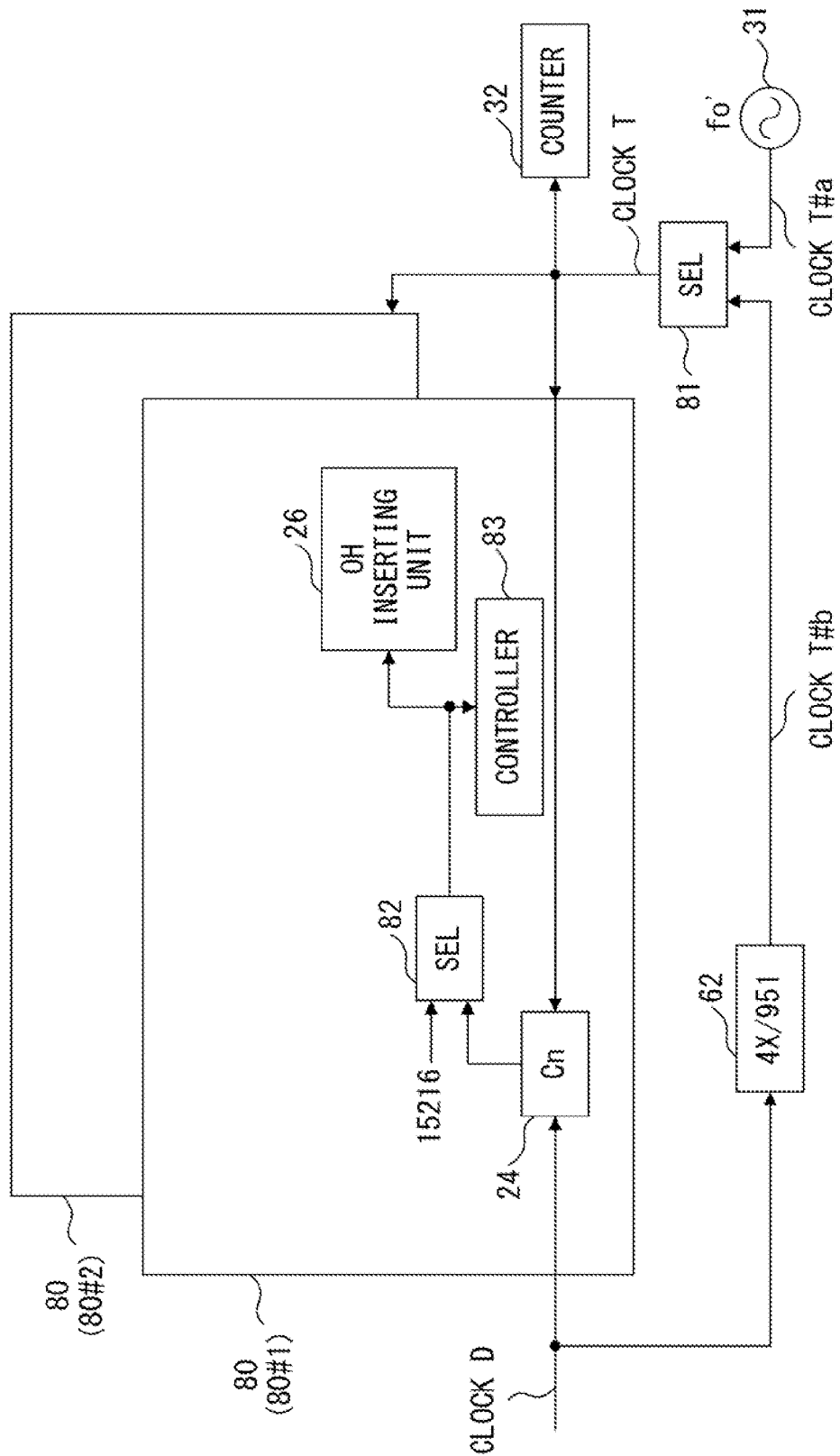
FIG. 18 illustrates an example of a mapping circuit-capable of selecting a mapping mode.

FIG. 18 illustrates an example of the mapping circuit capable of selecting the mapping mode. The mapping circuit illustrated in FIG. 18 can selectively use the asynchronous GMP illustrated in FIG. 11 or the bit-synchronous GMP illustrated in FIG. 14. A switch 81 selects a clock signal T#a generated by the clock generator 31 or a clock signal T#b generated by the clock generator 62 depending on the mapping mode selecting signal. The clock signal selected by the switch 81 is provided for each framer 80 (80#1, 80#2) as the clock signal T.

In each framer 80, a switch 32 selects the Cn value detected by the Cn detector 24 or the fixed value of 15216 depending on the mapping mode selecting signal. The Cn value selected by the switch 82 is provided for the overhead inserting unit 26 and for the controller 83.

If the mapping mode selecting signal specifies the asynchronous GMP, the switch 81 selects the clock signal T#a generated by the clock generator 31, and the switch 82 selects the Cn value detected by the Cn detector 24. The controller 83 carries out the mapping by the asynchronous GMP. On the other hand, if the mapping mode selecting signal specifies the bit-synchronous GMP, the switch 81 selects the clock signal T#b generated by the clock generator 62, and the switch 82 selects the fixed value of 15216. The controller 83 then carries out the mapping by the bit-synchronous GMP. The mapping mode selecting signal may be defined by a user or a network administrator, for example.

Figure 19:
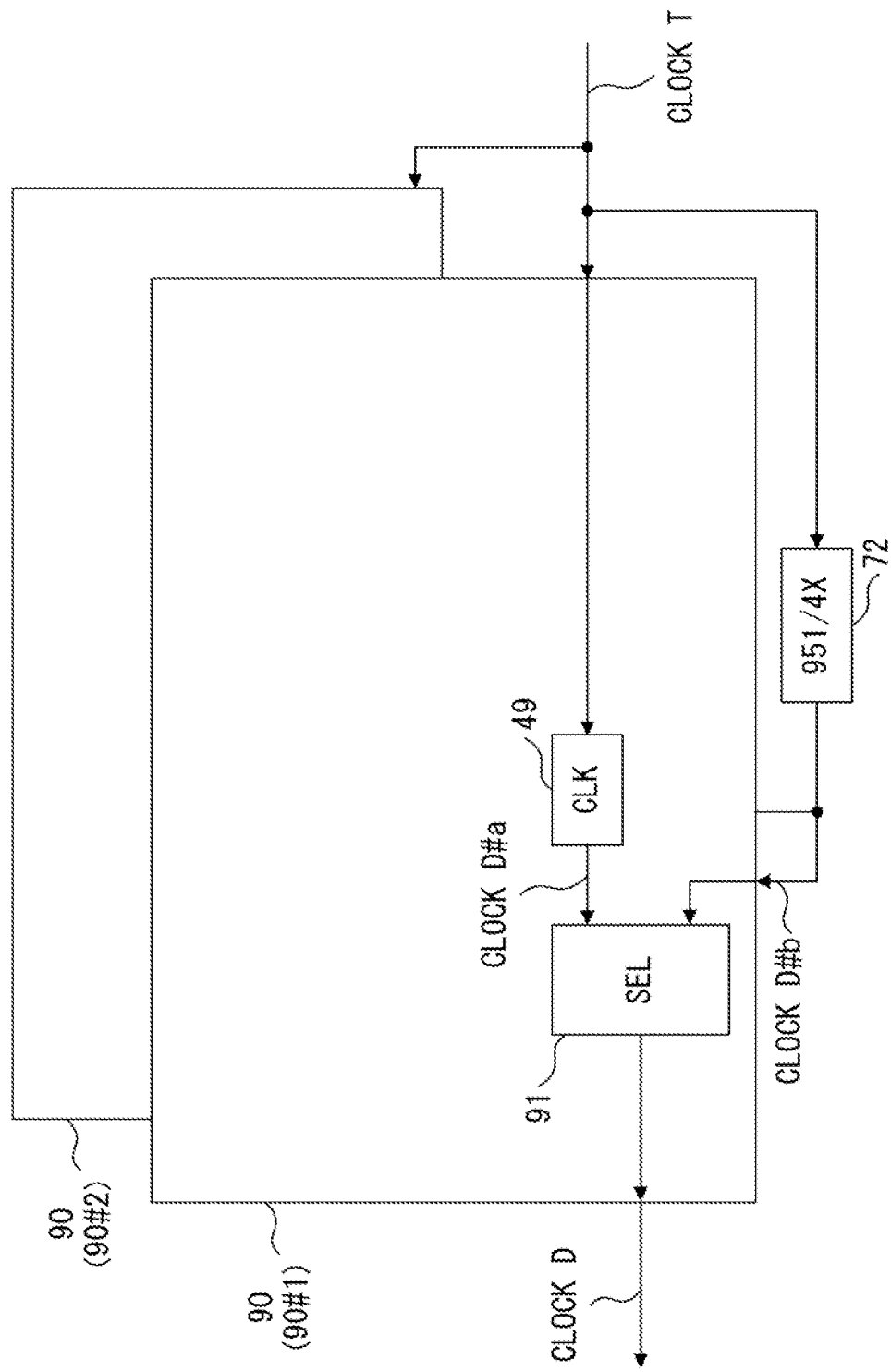
FIG. 19 illustrates an example of a demapping circuit capable of selecting a mapping mode.

FIG. 19 illustrates an example of the demapping circuit capable of selecting the mapping mode. The demapping circuit illustrated in FIG. 19 can selectively use the asynchronous GMP illustrated in FIG. 13 or the bit-synchronous GMP illustrated in FIG. 15. In each framer 90, a switch 91 selects a clock signal D#a generated by the clock generator 49 or a clock signal D#b generated by the clock generator 72 depending on the mapping mode selecting signal. The clock signal selected by the switch 91 is used as the clock signal D for reading out data from the buffer memory 50.

If the mapping mode selecting signal specifies the asynchronous GMP, the switch 91 selects the clock signal D#a generated by the clock generator 49. On the other hand, if the mapping mode selecting signal specifies the bit-synchronous GMP, the switch 91 selects the clock signal D#b generated by the clock generator 72. The mapping mode selecting signal may be defined by a user or a network administrator, for example. Alternatively, the framer 90 may decide which of the asynchronous GMP and the bit-synchronous GMP is selected in the transmitting node based on the PT-PSI information stored in the received frame.

In examples illustrated in FIG. 18 and FIG. 19, the asynchronous GMP illustrated in FIG. 11 and FIG. 13, or the bit-synchronous GMP illustrated in FIG. 14 and FIG. 15 is selected. The present invention, however, is not limited to this configuration. Specifically, the asynchronous GMP illustrated in FIG. 11 and FIG. 13, or the bit-synchronous GMP illustrated in FIG. 16 and FIG. 17 may be selected.

Next, an example of the mapping from, the ODL4Cn.n/ODU4 frame to the OTL4CnV.n/OTU4V frame is described. In the following description, the OTL4CnV.n/OTU4V frame includes 16X columns×4 rows, as illustrated in FIG. 20A. A payload area is allocated in 17th to 3824th columns. The ODL4Cn.n/ODU4 frame is mapped to the payload of the OTL4CnV.n/OTU4V frame.

The bit rate of the ODL4Cn.n/ODU4 frame is as follows.

$$(239/227) \times 99532800 \text{ [kbps]}$$

In this case, the bit rate of the OTL4CnV.n/OTU4V frame is defined as follows.

$$(16X/3804) \times (239/227) \times 99532800 \text{ [kbps]}$$

It is assumed that m of Cm is 128 (128 bit=16 bytes) in the GMP. Hence, the payload of the OTL4CnV.n/OTU4V frame is divided into 952 16-byte words, as illustrated in FIG. 20B. The ODL4Cn.n/ODU4 frame data is mapped to the payload of the OTL4CnV.n/OTU4V frame every 16 bytes.

The frequencies of the clock signals for processing the ODL4Cn.n/ODU4 frame and the OTL4CnV.n/OTU4V frame have respective frequency deviations. For example, in FIG. 9A, the clock frequencies of the ODU4 #1 to ODU4 #n may be different from one another. The clock frequencies of the OTU4V #1 to OTU4V #n may also be different from one another. The deviation of the clock frequency depends on the variation in property of the oscillator or the like, for example. In the OTN, frequency deviation of ±20 ppm is tolerated.

Accordingly, in the mapping from the ODL4Cn.n/ODU4 frame to the OTL4CnV.n/OTU4V frame, for example, if the ODL4Cn.n/ODU4 frame is transmitted with a smaller clock frequency than a reference value, data volume mapped to the OTL4CnV.n/OTU4V frame during a specified period of time becomes smaller than an expected value. To the contrary, if the ODL4Cn.n/ODU4 frame is transmitted with a greater clock frequency than the reference value, data volume mapped to the OTL4CnV.n/OTU4V frame during the specified period of time becomes greater than the expected value.

FIG. 21 illustrates an example of an expected range of the Cm. The Cm value represents the data volume mapped in the payload of the OTL4CnV.n/OTU4V frame as the number of 16-byte words. In this example, Cm=951 is equivalent to the Nominal value. The tolerance of the clock frequency deviation is ±20 ppm. In this case, the Cm may be any value within a range of 950.962 to 951.038. However, the mapping is carried out by 16-byte word, and thus the Cm value is integer. Accordingly, the Cm value is limited to any one of 950, 951, and 952 in this example.

As aforementioned, since the clock frequency for processing the frame has deviation, the Cm value of the GMP is not uniquely determined. Hence, a stuff is used in order to adjust a difference in clock frequency between the ODL4Cn.n/ODU4 frame and the OTL4CnV.n/OTU4V frame. Here, "adjustment" corresponds to processing of absorbing or compensating a difference in clock frequency resulted from the frequency deviation of the clock signal or the like.

FIG. 22 illustrates an example of positions where the stuff is allocated. In the present example, in the case of Cm=950, the 16-byte stuff is respectively inserted in the 17th column to the 32nd column of the first row and in the 17th column to the 32nd column of the third row. In the case of Cm=951, the 16-byte stuff is inserted in the 17th column to the 32nd column of the first row. In the case of Cm=952, no stuff is inserted.

For example, in the framer 20 illustrated in FIG. 11, the overhead inserting unit 26 calculates the Cm value based on the Cn value detected by the Cn detector 24 for each output frame. The overhead inserting unit 26 inserts the 16-byte stuffs whose number corresponds to the calculated Cm value to the positions illustrated in FIG. 22. At this time, the overhead inserting unit 26 cumulatively adds CnD that is a remainder obtained by dividing the Cn value by "16" or "m/n". In other words, the ΣCnD is calculated. Based on the calculated ΣCnD, the overhead, inserting unit 26 adjusts the Cm value if necessary. When the Cm value is adjusted, the number of stuffs to be inserted is also adjusted in accordance with this adjustment.

FIG. 23 illustrates an example of the mapping by the asynchronous GMP. In this example, four frame signals #1 to #4 are input into a mapping circuit 100. These four input frame signals #1 to #4 are, for example, ODU4#1 to ODU4#4 that are respectively generated using different clocks from one another. The clock frequencies of ODU4#1, ODU4#2, ODU4#3, and ODU4#4 are f1, f2, f3, and f4, respectively. In the mapping circuit 100, a circuit, for mapping the input frame signals #1 to #4 to respective output frame signals #1 to #4 is implemented by using the framer 20 illustrated in FIG. 11, for example.

Each input frame signal (ODU4#1 to ODU4#4) is written on its corresponding buffer memory. Each buffer memory is implemented by using the buffer memory 22 in the example illustrated in FIG. 11. Each frame signal scored on the buffer memory is read out by using the common clock signal having the frequency of $f_0'$. This common clock signal is equivalent to the clock signal T in the example illustrated in FIG. 11, and is generated by the clock generator 31. The frame signal read out from the buffer memory is mapped to the corresponding payload of the OTU4V frame.

The mapping circuit 100 calculates the stuff volume to be inserted for each frame signal #1-#4. The stuff volume to be inserted is decided by the Cm value and the ΣCnD that are calculated based on the Cn value as described above. In the present example, the respective clock frequencies (f1, f2, f3, f4) of the input frame signals #1-#4 may not be the same. Hence, the Cn values of the frame signals #1-#4 may not be the same; and consequently, the respective stuff volumes to be inserted in the frame signals #1 to #4 may not foe the same, either.

In the frame signal #1, the stuff is inserted such that the difference between the clock frequency f1 and the clock frequency $f_0'$ is adjusted (or absorbed). Similarly, in the frame signal #2, the stuff is inserted such that the difference between the clock frequency f2 and the clock frequency $f_0'$ is adjusted. In the frame signal #3, the stuff is inserted such that the difference between the clock frequency f3 and the clock frequency $f_0'$ is adjusted. In the frame signal #4, the stuff is inserted such that the difference between the clock frequency f4 and the clock frequency $f_0'$ is adjusted. In the example illustrated in FIG. 23, at a certain time point, one 16-byte stuff is inserted in the OTU4V #1, two 16-byte stuffs are inserted in the OTU4V #2, and one 16-byte stuff is inserted in the OTU4V #4. No stuff is inserted in the OTU4V #3.

As aforementioned, according to the transmission method of the present embodiment, a plurality of frame signals that are asynchronous with one another are read out from the buffer memories using the same clock signal, and are mapped to respective frame signals (OUT4V#1 to OUT4V#4). Thus, clock synchronization is established among the output frame signals.

For example, it is assumed that the OTU4V#1 and the OTU4V#2 are transmitted on the H polarized wave and the V polarized wave of the dual polarization optical signal. In this case, clock synchronization is established between the OTU4V#1 and the OTU4V#2, and thus the optical receiver that receives the above dual polarization optical signal can accurately recover data from each polarized wave.

The input frame signals may be ODL4Cn.n subframes. In this case, the ODL4Cn.n subframes are respectively mapped to the payload of the OTL4CnV.n subframes. Here, it is assumed that the ODL4C4.4 subframes #1 to #4 obtained from the ODU4C4 frame are input into the mapping circuit 100, for example. In this case, the ODL4C4.4 subframes #1 to #4 are respectively mapped to the OTL4C4V.4 subframes #1 to #4 and are transmitted through respective virtual lanes. In this transmission, clock synchronization is established among the OTL4C4V.4 subframes #1 to #4. Accordingly, it is easy to manage the ODL4C4.4 subframes #1 to #4 as a single signal in the relay node and/or the received node.

The mapping circuit 100 illustrated in FIG. 23 carries out mapping of the frame signal by the asynchronous GMP. The transmission system of the present embodiment may support the bit-synchronous GMP in addition to the asynchronous GMP.

Figure 24:
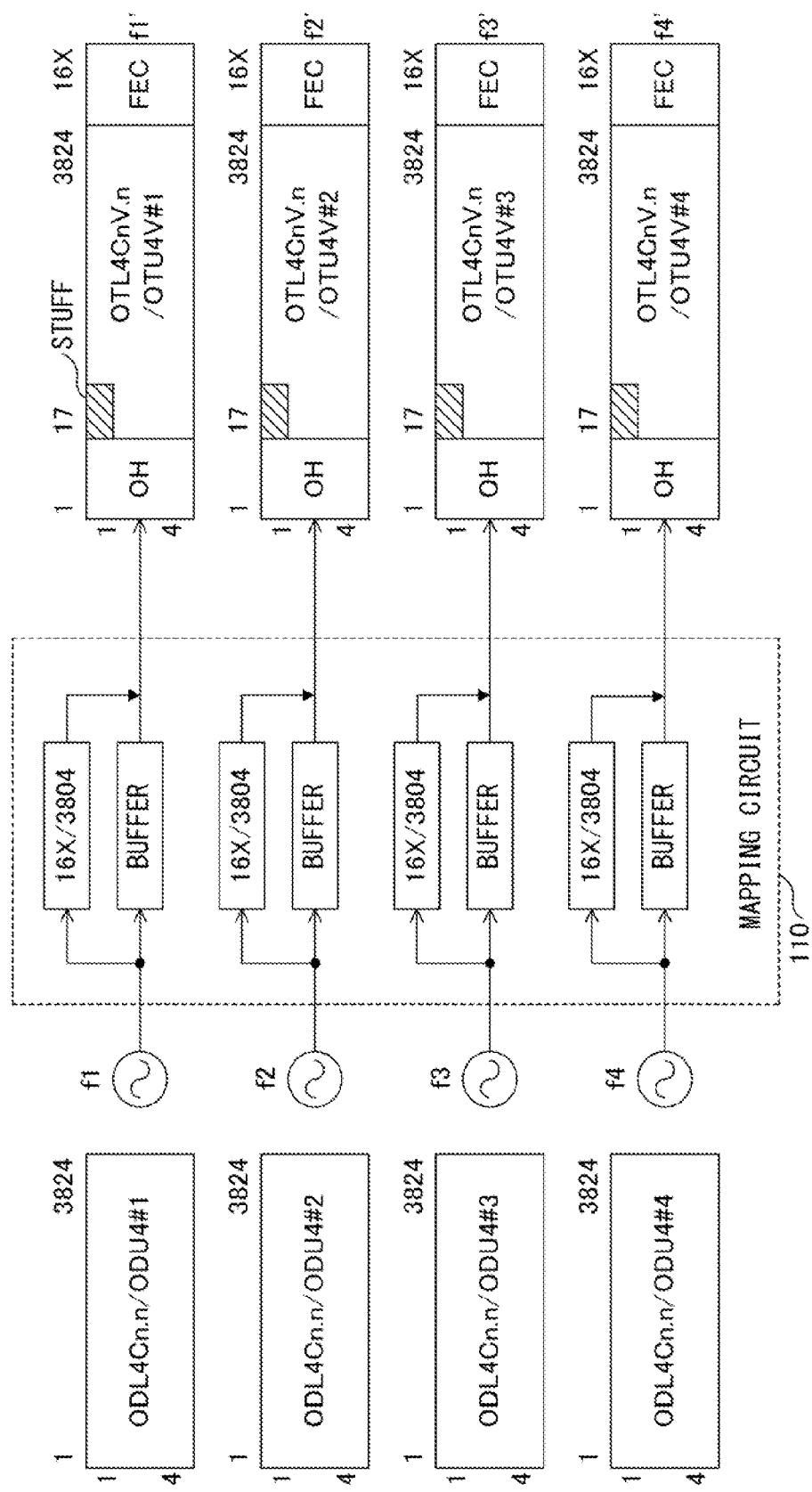
FIG. 24 illustrates an example of the mapping by the bit-synchronous GMP.

FIG. 24 illustrates an example of the mapping by the bit-synchronous GMP. It is assumed that the input frame signals #1 to #4 are the same in FIG. 23 and FIG. 24. In a mapping circuit 110 illustrated in FIG. 24, however, the circuit for mapping the input frame signals #1 to #4 to the output frame signals #1 to 114 may be implemented by using the framer 60 illustrated in FIG. 16, for example.

Each input frame signal (ODU4#1 to ODU4#4) is written on its corresponding buffer memory. Each buffer memory is implemented by using the buffer memory 22 in the example illustrated in FIG. 16. The frame signals stored on the buffer memories are read out by using different clock signals. For example, the ODU4#1 is read out at the frequency f1'. The frequency f1' is obtained by multiplying the frequency f1 of the writing clock by "16X/3084". A clock signal for reading out another frame signal is generated in the similar manner. Each frame signal read out, from its buffer memory is mapped to the payload of the OTU4V frame.

In the bit-synchronous GMP, the clock frequency used for reading out the frame signal from a corresponding buffer memory is multiplication of the clock frequency used for writing the frame signal on the buffer memory. Hence, the Cm value of the GMP is fixed to 951. Thus, one 16-byte stuff is inserted in each OTU4V frame. In the mapping circuit 110 illustrated in FIG. 24, the input frame signal may be the ODL4Cn.n subframes.

The buffer memory 22 illustrated in FIGS. 11, 14, and 16, the buffer memory 50 illustrated in FIGS. 13, 15, and 17, and each buffer memory illustrated in FIG. 23 and FIG. 24 are an example of a "memory" for storing the frame signal or digital data (information) included in the frame signal. The configuration that implements the "memory" is not limited to a specific one. Specifically, the "memory" is implemented by using an apparatus, a device, or a circuit for storing digital data or the like. For example, the "memory" may be implemented by using a large scale memory device, or a combination of circuit elements such as flip-flops.

Figure 25A:
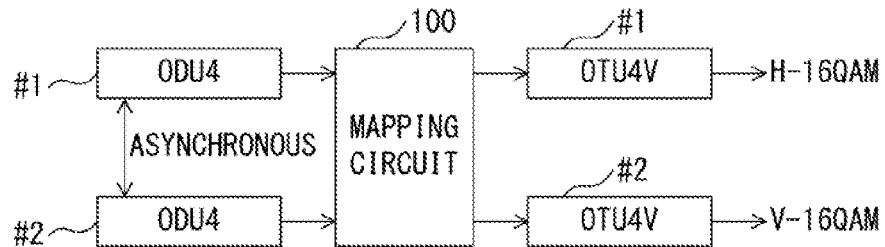
FIGS. 25A-25D illustrate examples of the mapping and the virtual lanes.

FIGS. 25A-25D illustrate examples of the mapping and the virtual lane. In FIG. 25A, the ODU4#1 and the ODU4#2 that are asynchronous with each other are mapped by the mapping circuit 100 to the OTU4V #1 and the OTUV#2, respectively. At this time, the mapping circuit 100 carries out the above mapping by the asynchronous GMP. The OTU4V #1 is converted into a driving signal for a 16QAM modulated optical signal to be transmitted on the H polarization. In addition, the OTU4V#2 is converted into a driving signal for a 16QAM modulated optical signal to be transmitted on the V polarization. Consequently, a DP-16QAM optical signal of approximately 28 Gbaud is generated. At this time, the OTU4V#1 is transmitted via a virtual lane generated by the H polarization, and the OTU4V#2 is transmitted via a virtual lane generated by the V polarization.

Figure 25B:
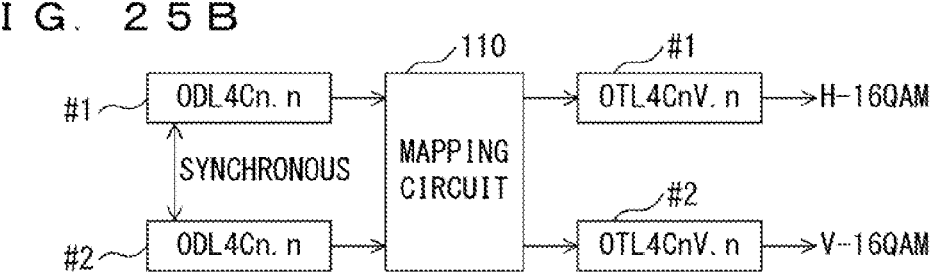

In FIG. 25B, the ODL4Cn.n#1 and ODL4Cn.n#2 are obtained from the ODU4Cn (n=2). In this case, the ODL4Cn.n#1 and ODL4Cn.n#2 are synchronous with each other. Hence, the ODL4Cn.n#1 and ODL4Cn.n#2 are snapped to the OTL4CnV.n#1 and the OTL4CnV.n#2 by the mapping circuit 110, respectively. At this time, the mapping circuit 110 carries out the above mapping by the bit-synchronous GMP. The OTL4CnV.n#1 and the OTL4CnV.n#2 are then transmitted on the DP-16QAM optical signal in the same manner as that in the example of FIG. 25A.

Figure 25C:
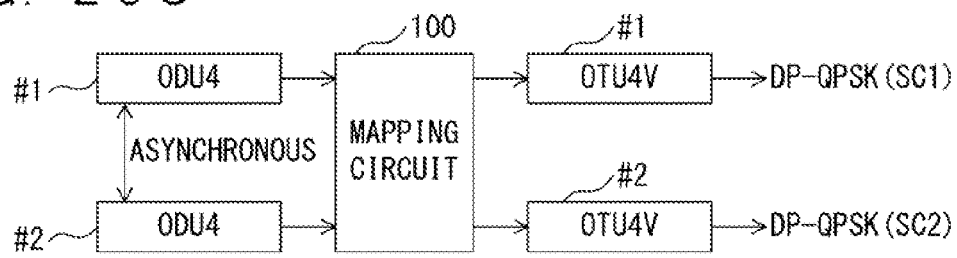

In FIG. 25C, as similar to the example of FIG. 25A, the ODU4#1 and the ODU4#2 are mapped by the mapping circuit 100 to the OTU4V#1 and the OTUV#2, respectively. In the example illustrated in FIG. 25C, however, the OTU4V#1 is converted into the driving signal for a DF-QPSK modulated optical signal, and allocated to the subcarrier SC1. Similarly, the OTU4V#2 is converted into the driving signal for the DP-QPSK modulated optical signal, and allocated to the subcarrier SC2. Consequently, the HUM transmission that uses two wavelengths is carried out. At this time, the OTU4V#1 is transmitted via the virtual lane generated by the subcarrier SC1, and the OTU4V#2 is transmitted via the virtual lane generated by the subcarrier SC2.

Figure 25D:
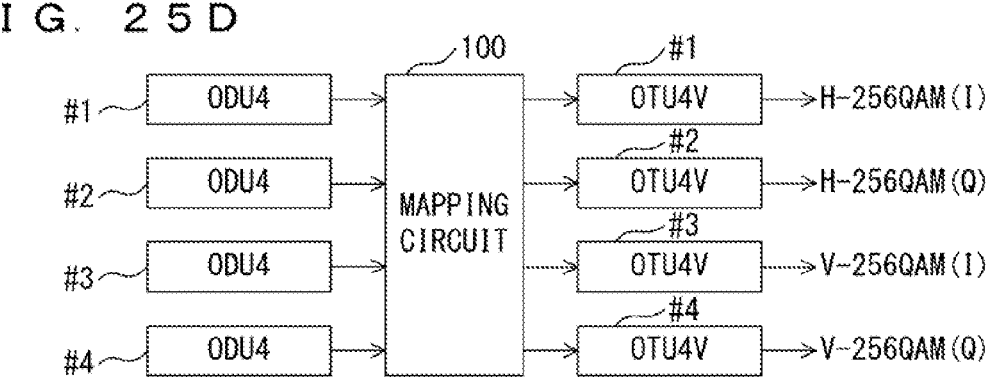

In FIG. 25D, the ODU4#1 to OTU4#4 that are asynchronous with each other are mapped by the mapping circuit 100 to the OTU4V#1 to OTU4V#4, respectively. The OTU4V#1 is converted into an I component signal for a 256QAM modulated optical signal transmitted by R polarization. The OTU4V#2 is converted into a Q component signal for a 256QAM modulated optical signal transmitted by H polarization. The OTU4V#3 is converted into an I component signal, for a 256QAM modulated optical signal transmitted by V polarization. The OTU4V#4 is converted into a Q component signal for a 256QAM modulated optical signal transmitted by V polarization. Consequently, the DP-256QAM optical signal of approximately 28 Gbaud is generated. At this time, the OTU4V#1 is transmitted via a virtual lane generated by the I component of the multi-level modulation and the R polarization, the OTU4V#2 is transmitted via a virtual lane generated by the Q component of the multi-level modulation and the H polarization, the OTU4V#3 is transmitted via a virtual lane generated by the I component of the multi-level modulation and the V polarization, and the OTU4V#4 is transmitted via a virtual lane generated, by the Q component of the multi-level modulation and the V polarization.

Figure 26:
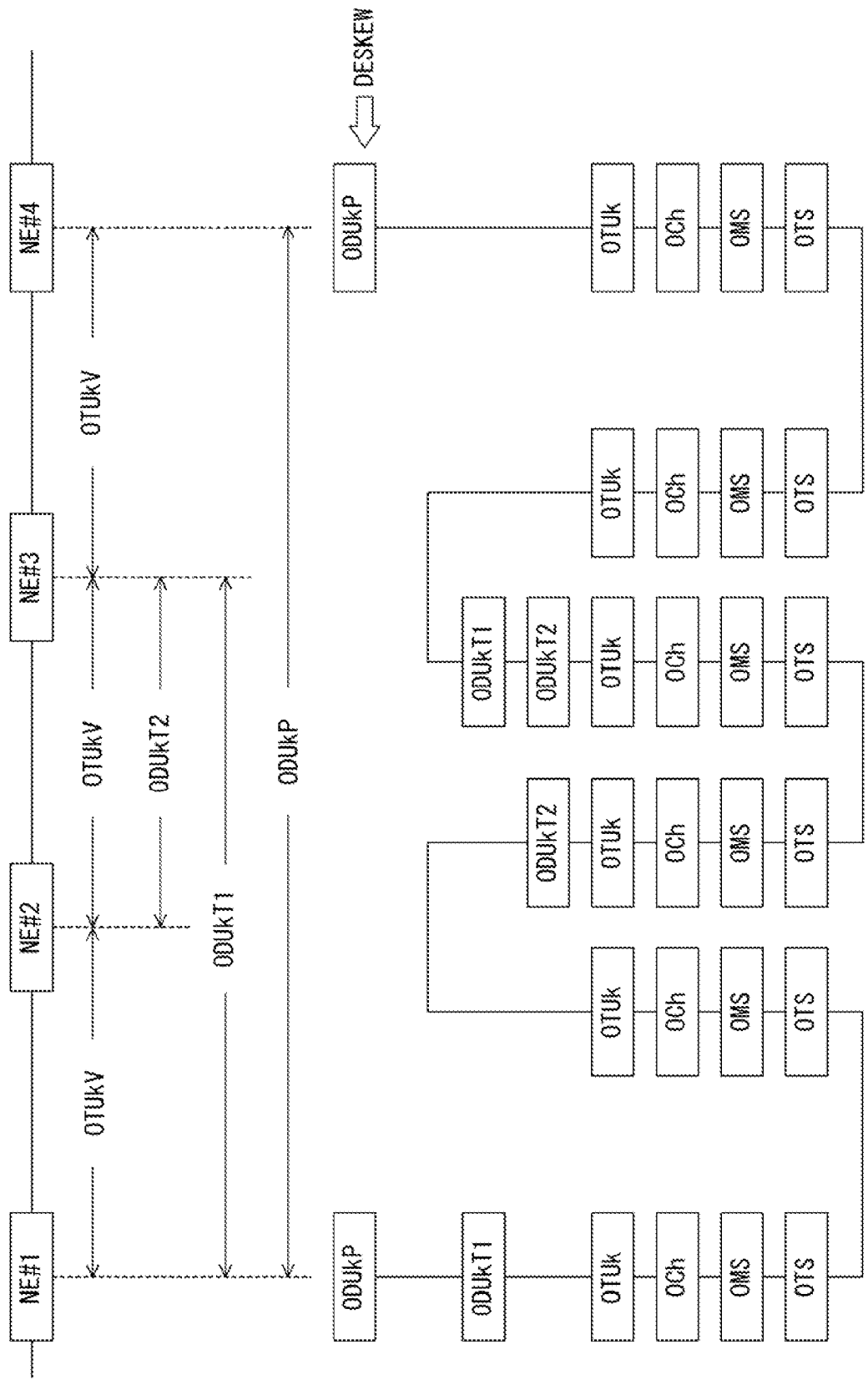
FIG. 26 illustrates an example of a monitoring point on the transmission system.

FIG. 26 illustrates an example of a monitoring point in the transmission system. In the example illustrated in FIG. 26, data is transmitted from the node equipment NE#1 via the node equipments NE#2 and NE#3 to the node equipment NE#4.

At the End-to-End (i.e. between NE#1 and NE#4), the path is monitored at the ODUkP (Optical Data Unit-k Path monitoring level). Between the node equipments NE#1 and NE#3, the connection is monitored at the ODUkT1 (Optical Data Unit-k Tandem connection monitoring level 1). In addition, between the node equipments NE#2 and NE#3, the connection is monitored at the ODUkT2. The abbreviations represented in FIG. 26 denote as follows:

OCh: Optical Channel with full functionality
OMS: Optical Multiplex Section
OTS: Optical Transmission Section Hereinafter, it is assumed that client data of more than 100 Gbps is transmitted. In this case, this client data is mapped to the ODU4Cn. The ODU4Cn is decomposed into a plurality of ODL4Cn.n, and further mapped to a plurality of OTL4CnV.n subframes so as to be transmitted, as aforementioned. At the End-to-End, the monitoring and the control of the path are integrally carried out by the ODU4Cn.

When the plurality of OTL4CnV.n subframes are transmitted using the dual polarization and/or the WDM, skew is generated among the OTL4CnV.n subframes due to chromatic dispersion, polarization mode dispersion, route delay of the optical fiber in the node equipment, etc. The transmission system absorbs or compensates for the skew at the P-CMEP (Path-Connection Monitoring End Point). In the example illustrated in FIG. 26, no deskew is carried, oat in the relay nodes (NE#2, NE#3), and deskew is carried out in the receiving node (NE#4).

The deskew is carried out using FAS and MFAS. At this time, the capacity of detecting the skew amount is approximately 150μ seconds. In the method of carrying out the deskew among the subframes at the End-to-End, the transmission system preferably has a capacity of detecting a larger skew taking account of enhancement of the LOA (Loss Of Alignment) detecting capacity.

The transmission system of the present embodiment enhances the skew compensating capacity using the MFI (Multi Frame Indicator). As an example of this, as illustrated in FIG. 27A, "MFI1" and "MFI2" are added in the PM&TCM (Path Monitoring and Tandem Connection Monitoring). MFI1/MFI2 is added in LSB that is an unused bit in the PM&TCM overhead.

The MFI1/MFI2 is used as a 16-bit counter. For example, the MFI1/MFI2 is incremented every time the MFAS for generating 256 multiframes is reset (i.e. every 256 frames). The MFAS is used as the first stage, and the MFI1/MFI2 is used as the second stage. In this configuration, the capacity of detecting the skew becomes enhanced $2^{16}$ times larger than that in the case of using only the FAS/MFAS. As another example, as illustrated in FIG. 27B, the "MFI1" and the "MFI2" may be transmitted using unused bits in the overhead.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A transmission method that transmits an optical signal from transmitting node equipment to receiving node equipment via a plurality of virtual lanes in dual polarization or multi-level modulation, the transmission method comprising:
receiving a first frame signal of a first frequency and a second frame signal of a second frequency, and storing the first frame signal and the second frame signal on a memory in the transmitting node equipment;
reading out the first frame signal from the memory at a third frequency, and inserting a stuff into the first frame signal read out from the memory such that a difference between the first frequency and the third frequency is adjusted to generate a third frame signal;
reading out the second frame signal from the memory at the third frequency, and inserting a stuff into the second frame signal read out from the memory such that a difference between the second frequency and the third frequency is adjusted to generate a fourth frame signal; and
transmitting the third fame signal and the fourth frame signal respectively via different virtual lanes.

2. The transmission method according to claim 1, wherein the third frequency is higher than the first frequency and the second frequency.

3. The transmission method according to claim 1, wherein the first frame signal and the second frame signal are generated using different clock signals.

4. The transmission method according to claim 1, wherein the third frame signal is transmitted on one polarization of a dual polarization optical signal, and
the fourth frame signal is transmitted on the other polarization of the dual polarization optical signal.

5. The transmission method according to claim 1, wherein the third frame signal is transmitted by in-phase component signal of a multi-level modulated optical signal, and
the fourth frame signal is transmitted by quadrature component signal of the multi-level modulated optical signal.

6. The transmission method according to claim 1, wherein the virtual lanes are generated by dual polarization, multi-level modulation, and wavelength division multiplexing, and
the third frame signal and the fourth frame signal are transmitted using different wavelengths.

7. The transmission method according to claim 1, wherein a clock signal used for reading out the first frame signal and the second frame signal from the memory at the third frequency is generated independently from the first frame signal and the second frame signal,
amount of the stuff to be inserted so as to generate the third frame signal is determined based on volume of data of the first frame signal received during a frame period of the third frame signal, and
amount of the stuff to be inserted so as to generate the fourth frame signal is determined based on volume of data of the second frame signal received during a frame period of the fourth frame signal.

8. The transmission method according to claim 1, wherein a read-out clock signal is generated from a clock signal synchronous with the first frame signal, and the first frame signal and the second frame signal are read out from the memory using the read-out clock signal.

9. The transmission method according to claim 1, wherein a first read-out clock signal is generated from a clock signal synchronous with the first frame signal,
a second read-out clock signal is generated from a clock signal synchronous with the second frame signal,
the first frame signal is read out from the memory using the first read-out clock signal, and
the second frame signal is read out from the memory using the second read-out clock signal.

10. The transmission method according to claim 1, wherein the first frame signal and the second frame signal respectively include a frame synchronous signal, and
the receiving node equipment compensates for skew between the first frame signal and the second frame signal generated during transmission from the transmitting node equipment to the receiving node equipment by using the frame synchronous signal inserted in the first frame signal and in the second frame signal.

11. A transmission method that transmits an optical signal from transmitting node equipment to receiving node equipment, via a plurality of virtual lanes in dual polarization or multi-level modulation, the transmission method comprising:
receiving a first frame signal having a first frequency deviation and a second frame signal having a second frequency deviation, and storing the first frame signal and the second frame signal on a memory in the transmitting node equipment;
reading out the first frame signal from the memory at a specified read-out frequency, and inserting a stuff into the first frame signal read out from the memory such that a difference between the frequency of the first frame signal and the read-out frequency is adjusted to generate a third frame signal;
reading out the second frame signal from the memory at the read-out frequency, and inserting a stuff into the second frame signal read out from the memory such that a difference between the frequency of the second frame signal and the read-out frequency is adjusted to generate a fourth frame signal; and
transmitting the third fame signal and the fourth frame signal respectively via different virtual lanes.

12. Transmission equipment that transmits an optical signal via a plurality of virtual lanes in dual polarization or multi-level modulation, the transmission equipment comprising:
a memory configured to store a first frame signal of a first frequency and a second frame signal of a second frequency;
a first generator configured to read out the first frame signal from the memory at a third frequency, and insert a stuff into the first frame signal read out from the memory such that a difference between the first frequency and the third frequency is adjusted to generate a third frame signal;
a second generator configured to read out the second frame signal from the memory at the third frequency, and insert a stuff into the second frame signal read out from the memory such that a difference between the second frequency and the third frequency is adjusted to generate a fourth frame signal; and
a transmitter configured to transmit the third fame signal and the fourth frame signal respectively via different virtual lanes.

13. The transmission equipment according to claim 12, further comprising a clock generator configured to generate a clock signal independently from the first frame signal and the second frame signal, wherein the first generator reads out the first frame signal from the memory using the clock signal generated by the clock generator, and the second generator reads out the second frame signal from the memory using the clock signal generated by the clock generator.

14. A transmission system that transmits an optical signal from transmitting node equipment to receiving node equipment via a plurality of virtual lanes in dual polarization or multi-level modulation, wherein the transmitting node equipment comprises:

a memory configured to store a first frame signal of a first frequency and a second frame signal of a second frequency;

a first generator configured to read out the first frame signal from the memory at a third frequency, and insert a stuff into the first frame signal read out from the memory such that a difference between the first frequency and the third frequency is adjusted to generate a third frame signal;

a second generator configured to read out the second frame signal from the memory at the third frequency, and insert a stuff into the second frame signal read out from the memory such that a difference between the second frequency and the third frequency is adjusted to generate a fourth frame signal; and a transmitter configured to transmit the third fame signal and the fourth frame signal respectively via different virtual lanes, wherein the receiving node equipment receives the third frame signal and the fourth frame signal via the virtual lanes.

* * * * *